May 26, 1925.

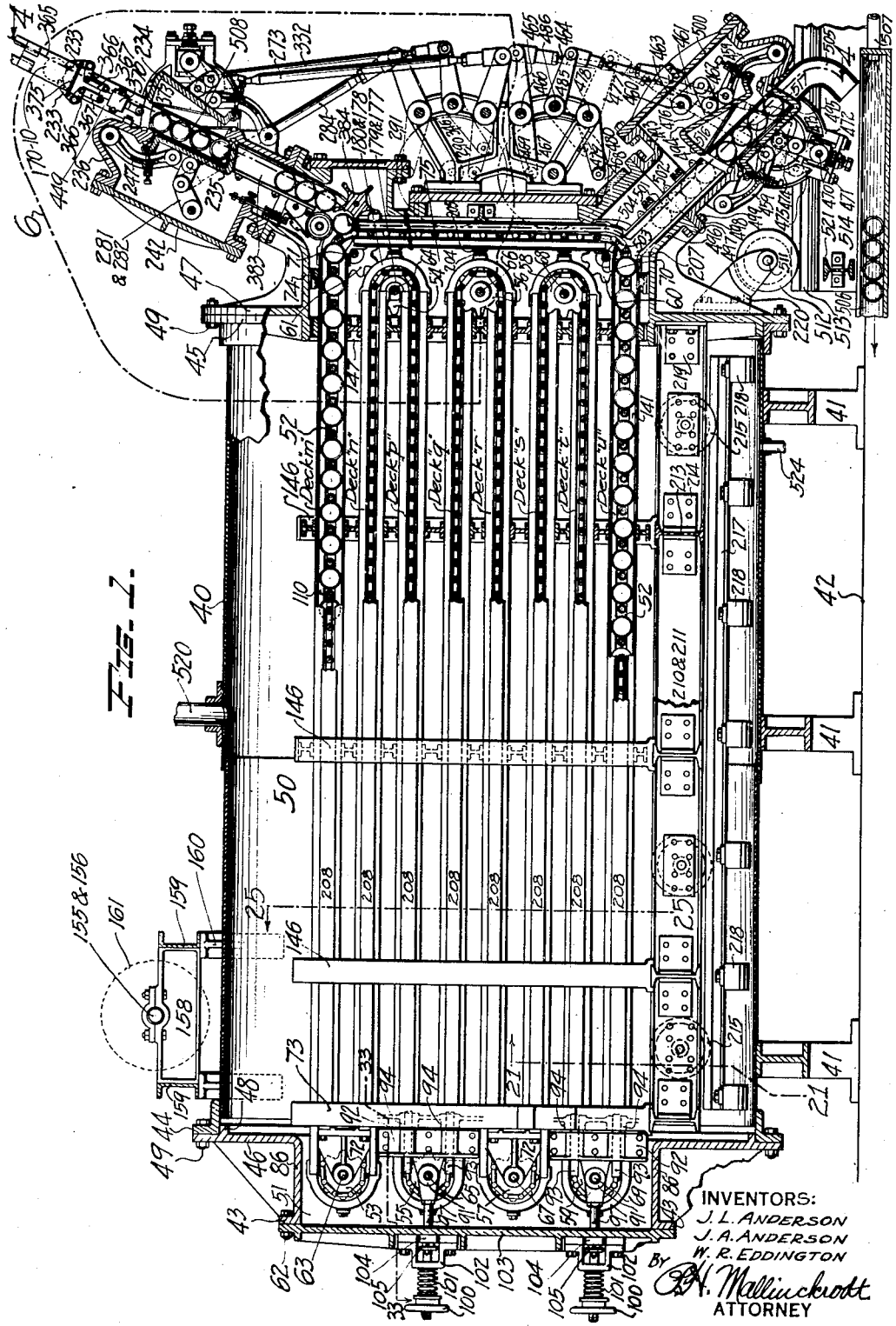

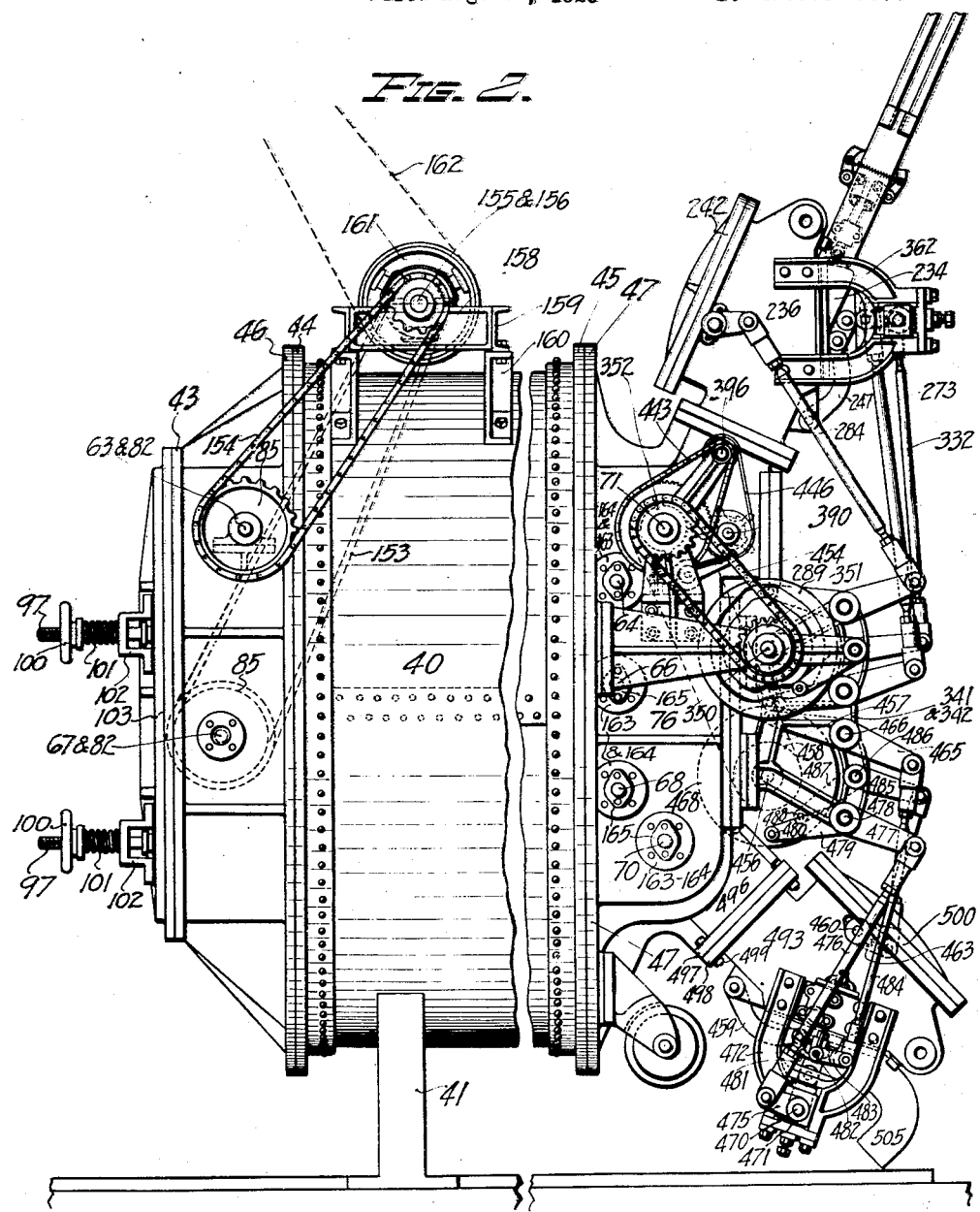

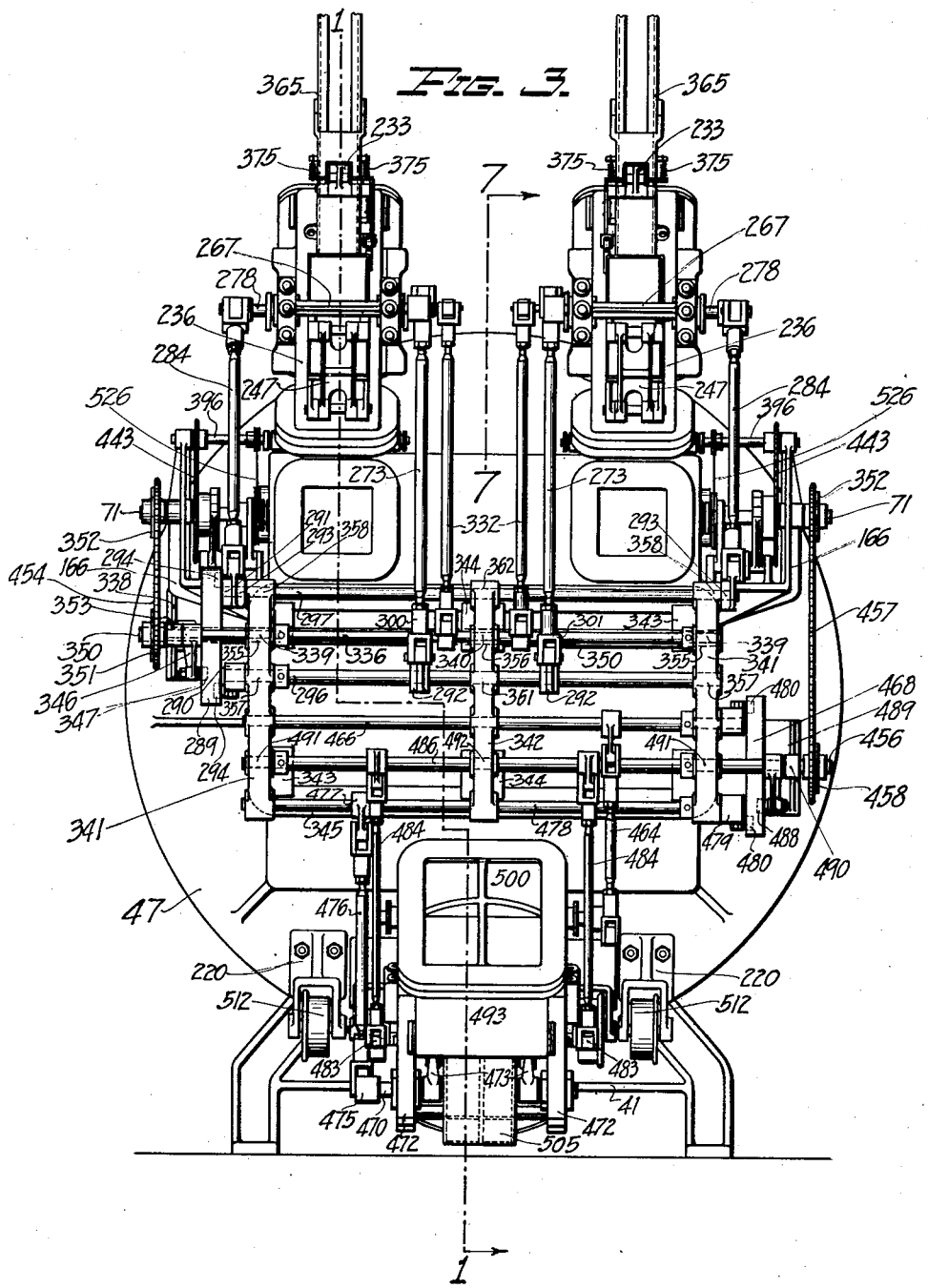

J. L. ANDERSON ET AL 1,539,793

AUTOMATIC CONTINUOUS PRESSURE COOKER

Filed Aug. 27, 1923

14 Sheets-Sheet 4

INVENTORS:
J. L. ANDERSON
J. A. ANDERSON
W. R. EDDINGTON
BY
ATTORNEY

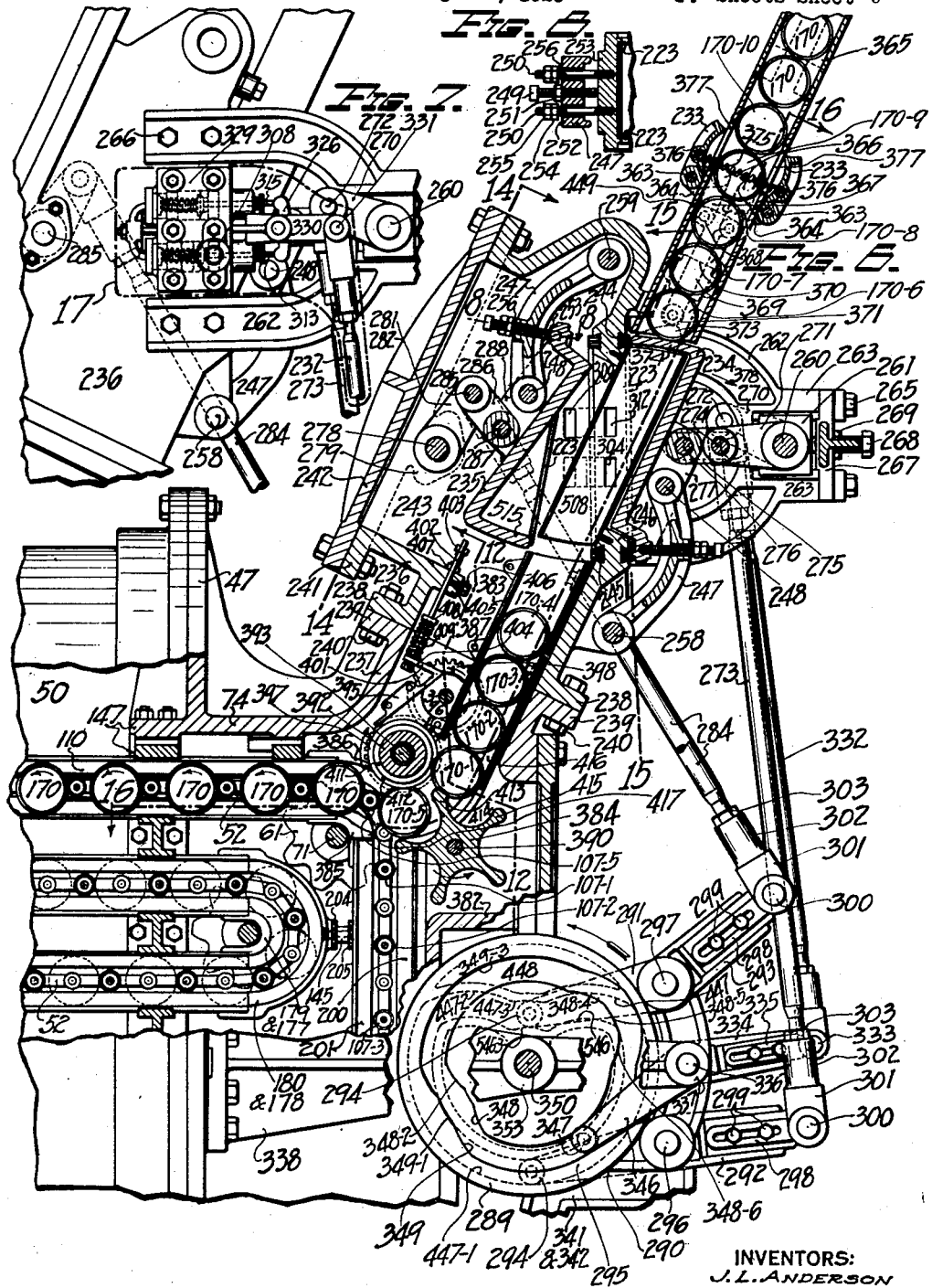

May 26, 1925.
J. L. ANDERSON ET AL
1,539,793
AUTOMATIC CONTINUOUS PRESSURE COOKER
Filed Aug. 27, 1923     14 Sheets-Sheet 6
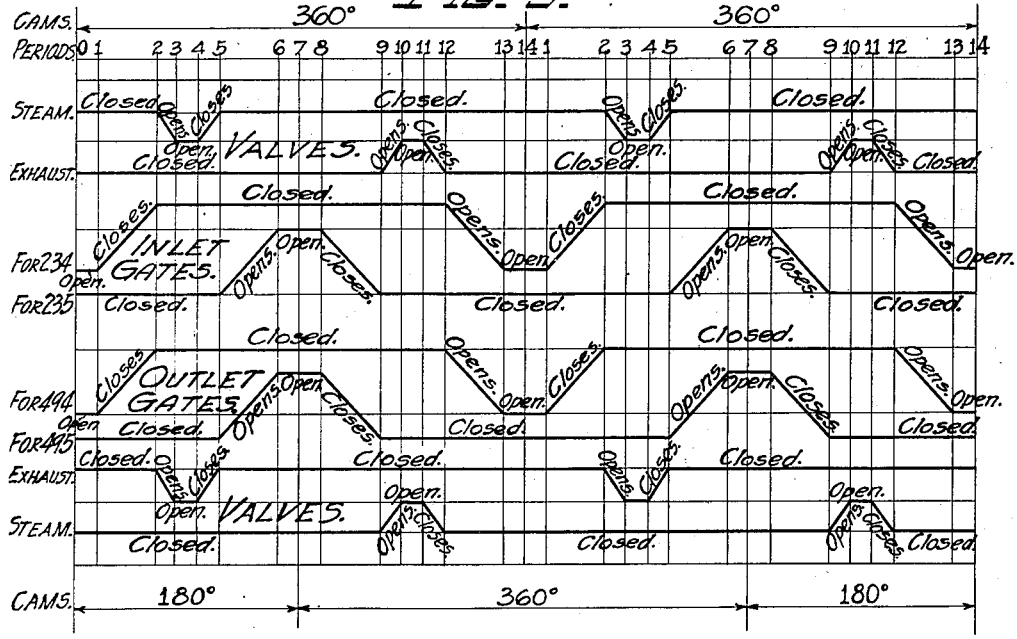
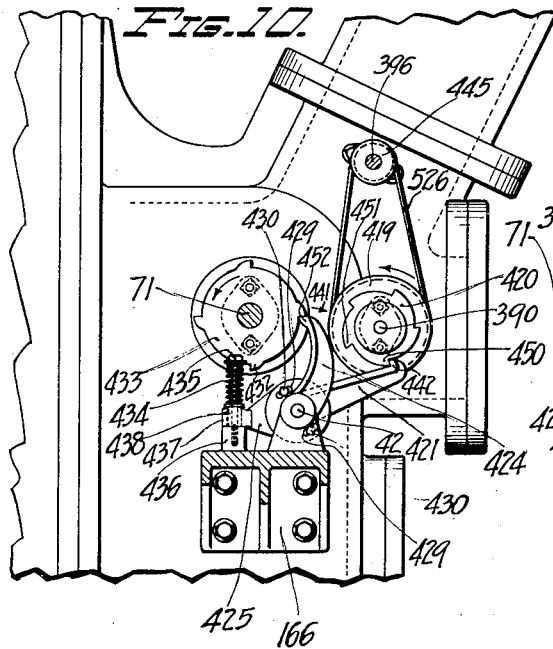
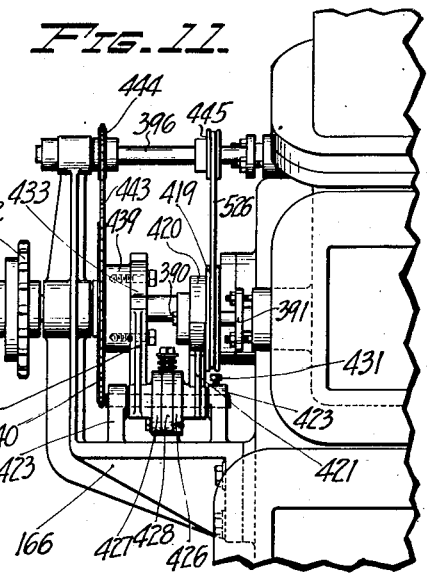
INVENTORS:
J. L. ANDERSON
J. A. ANDERSON
W. R. EDDINGTON
ATTORNEY

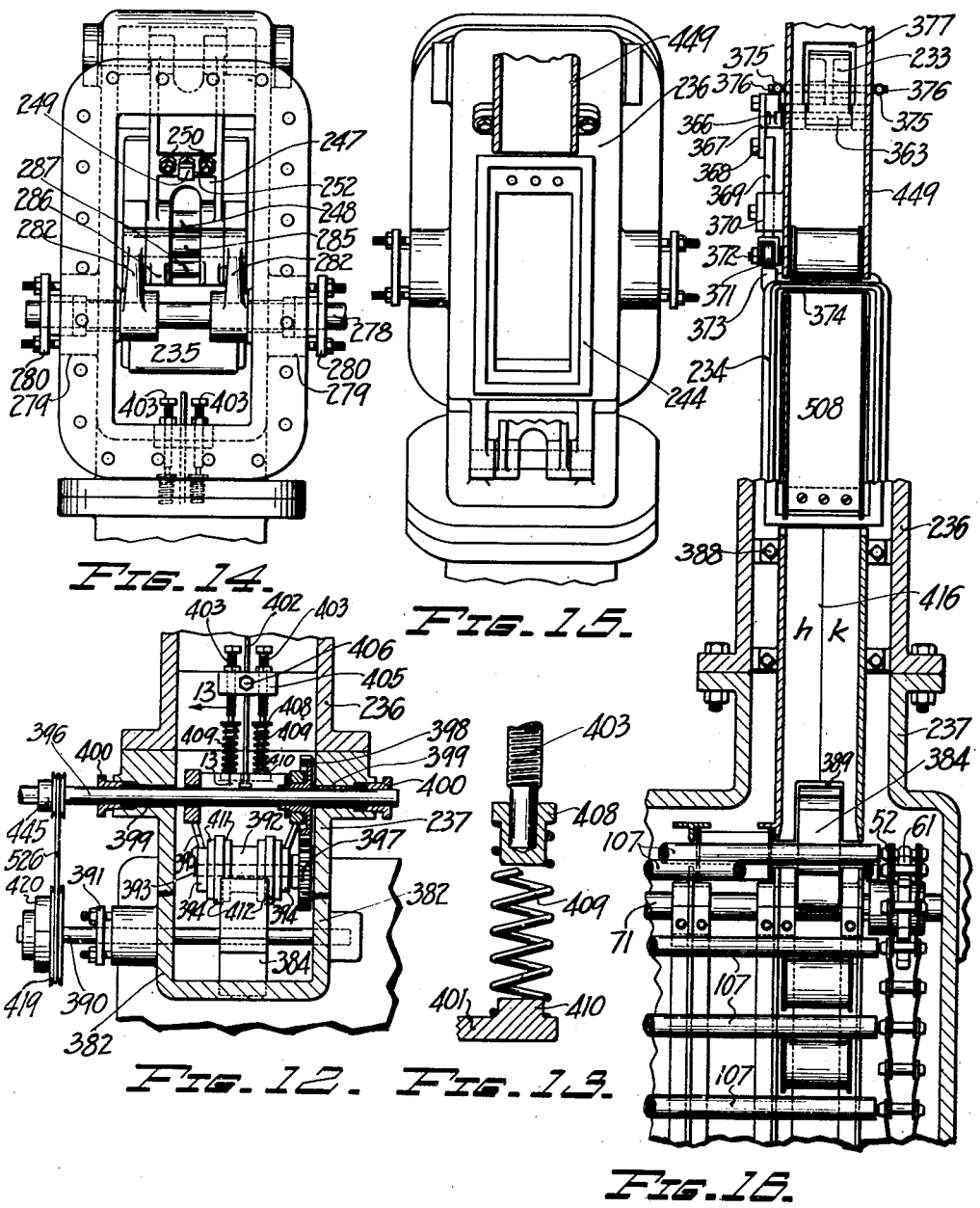

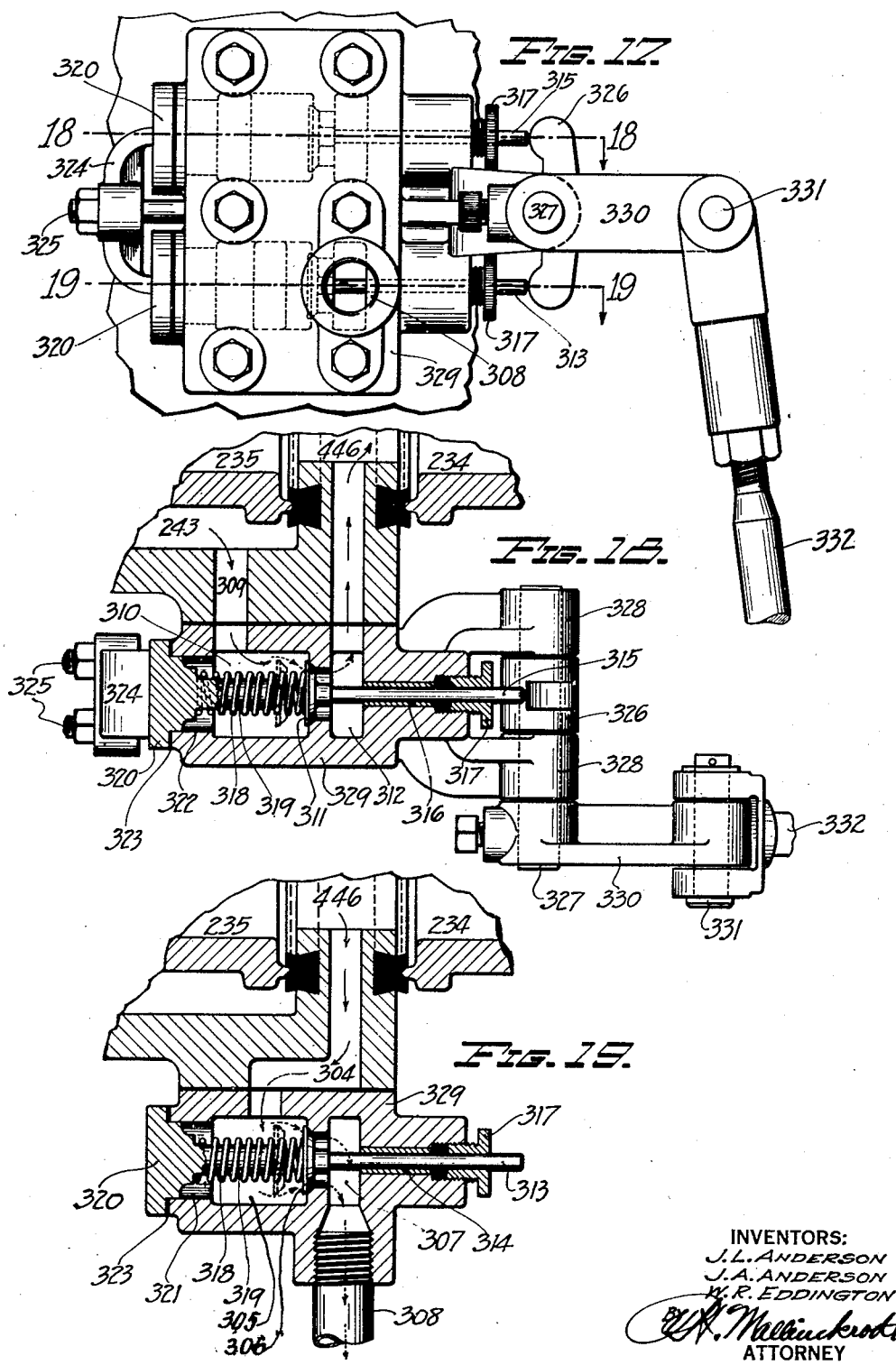

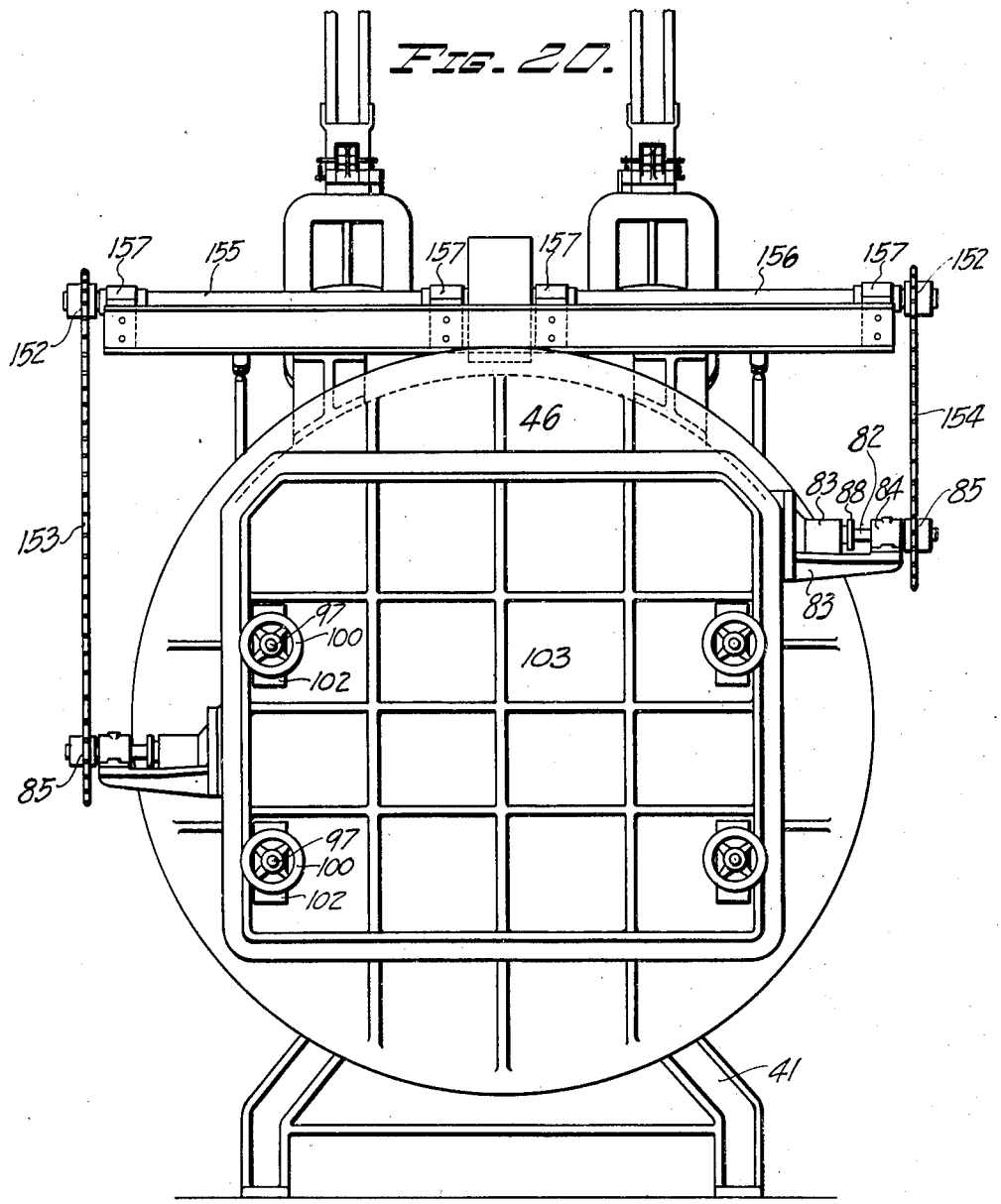

May 26, 1925.  1,539,793
J. L. ANDERSON ET AL
AUTOMATIC CONTINUOUS PRESSURE COOKER
Filed Aug. 27, 1923  14 Sheets-Sheet 10
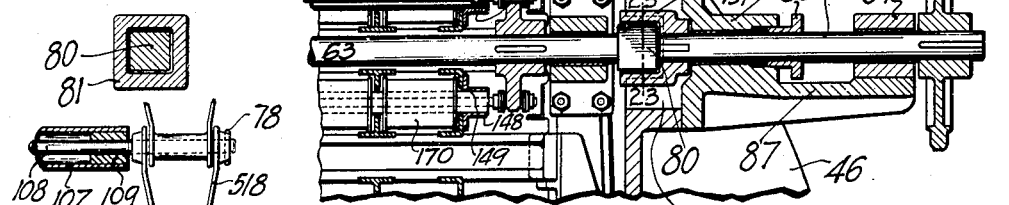
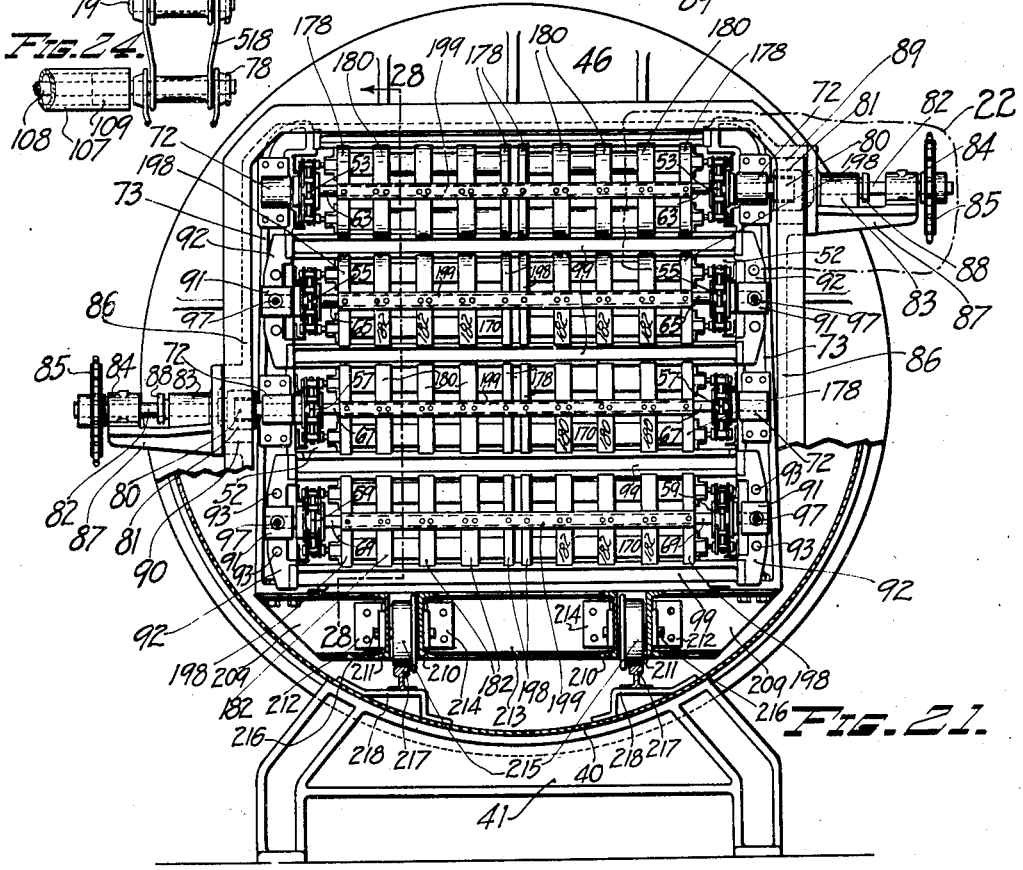
INVENTORS:
J. L. ANDERSON
J. A. ANDERSON
W. R. EDDINGTON
BY
ATTORNEY

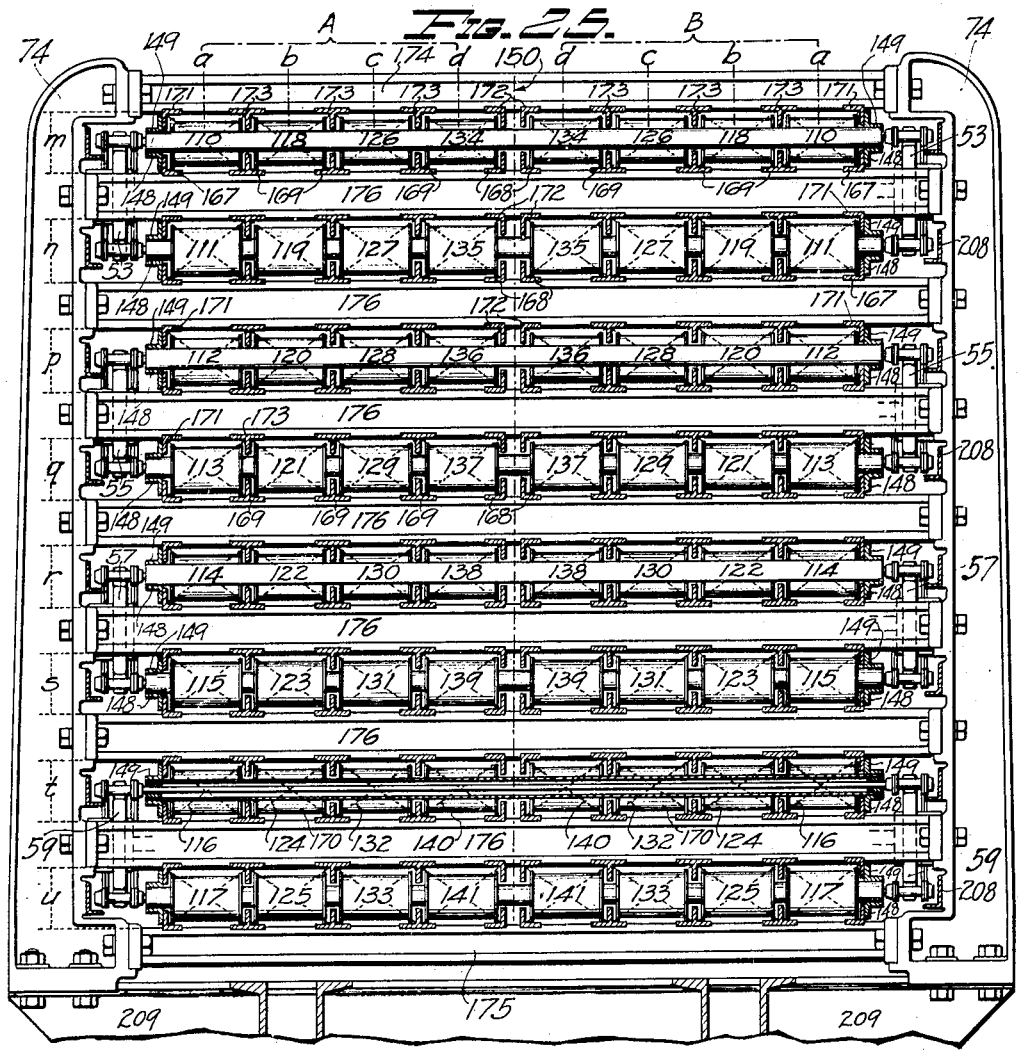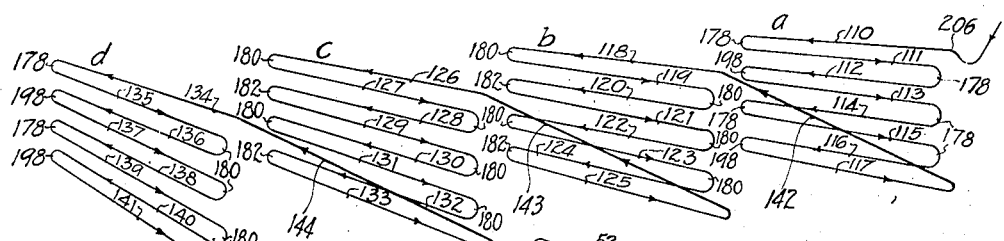

May 26, 1925.  1,539,793
J. L. ANDERSON ET AL
AUTOMATIC CONTINUOUS PRESSURE COOKER
Filed Aug. 27, 1923    14 Sheets-Sheet 12
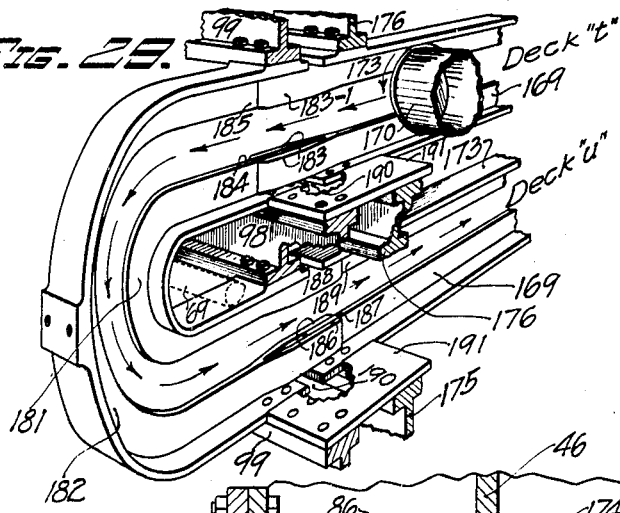
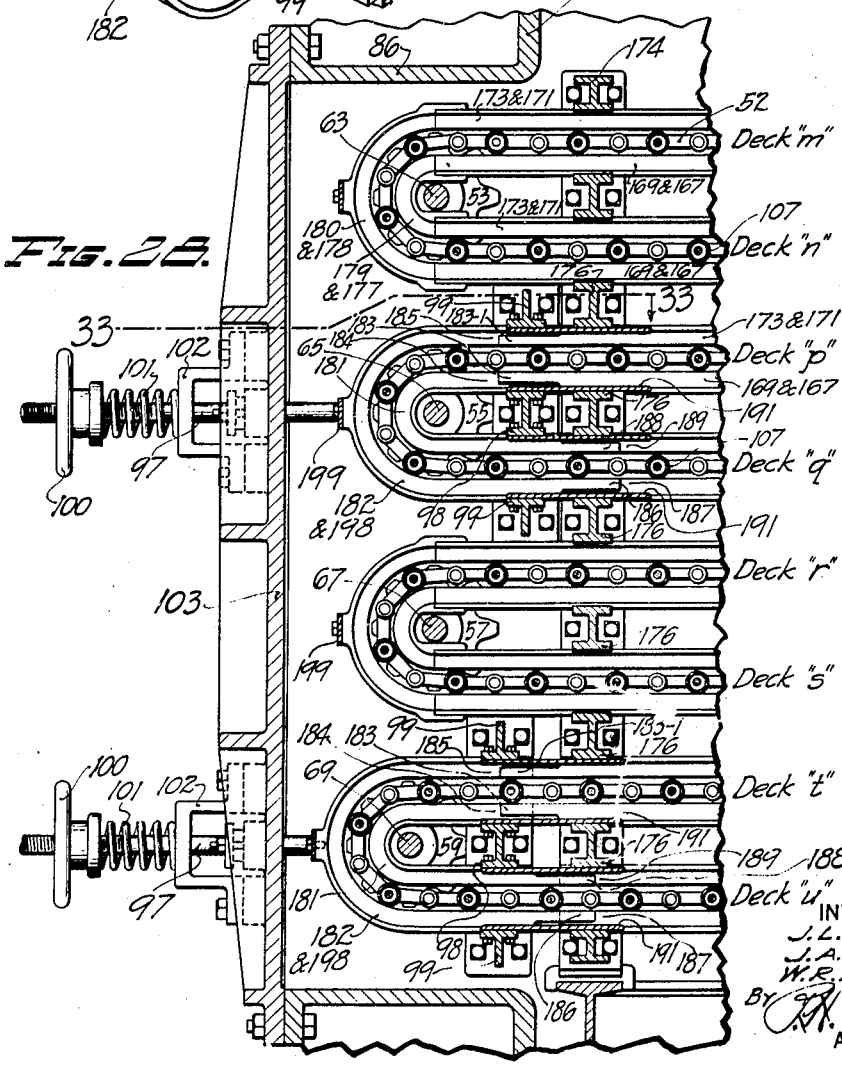

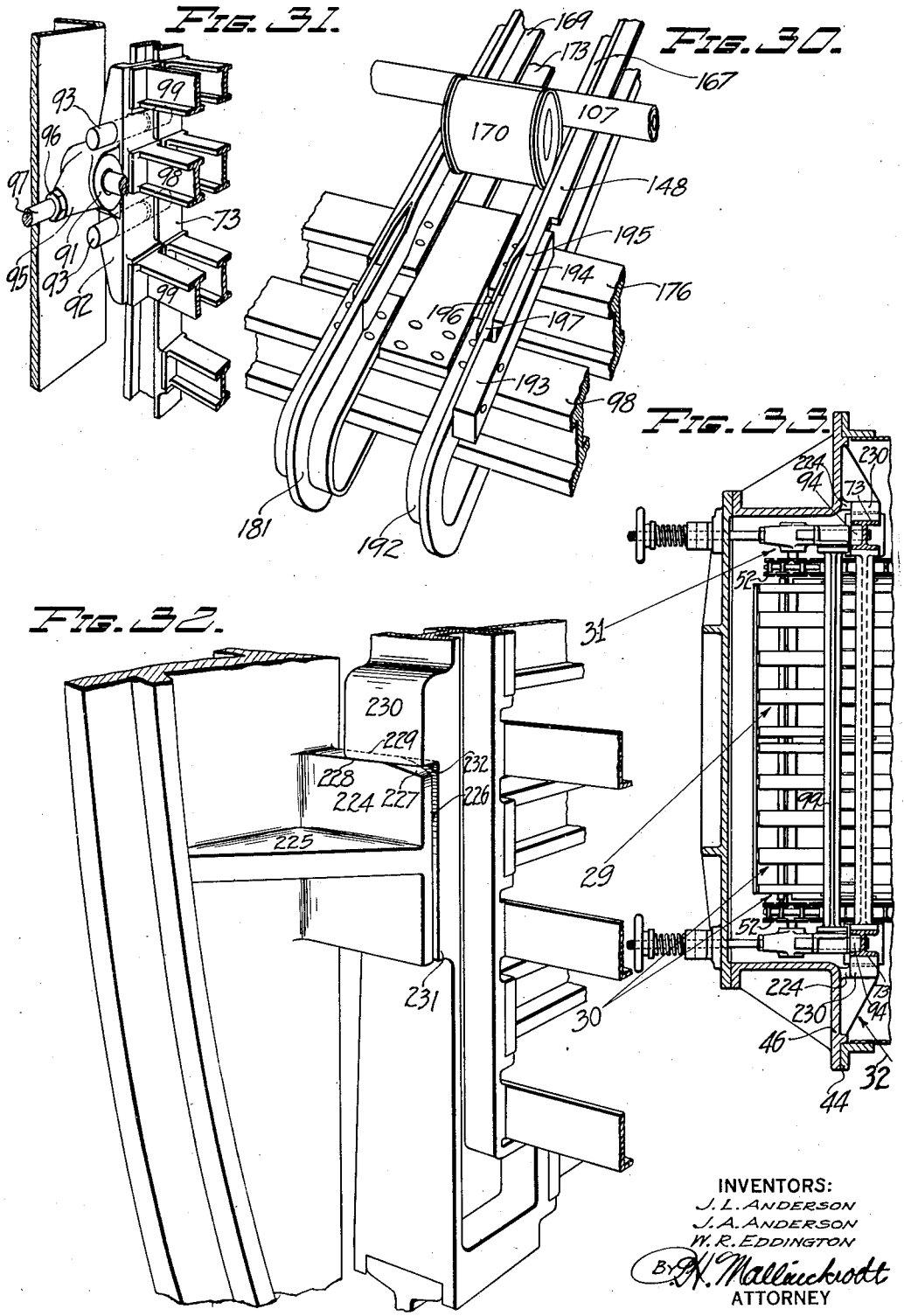

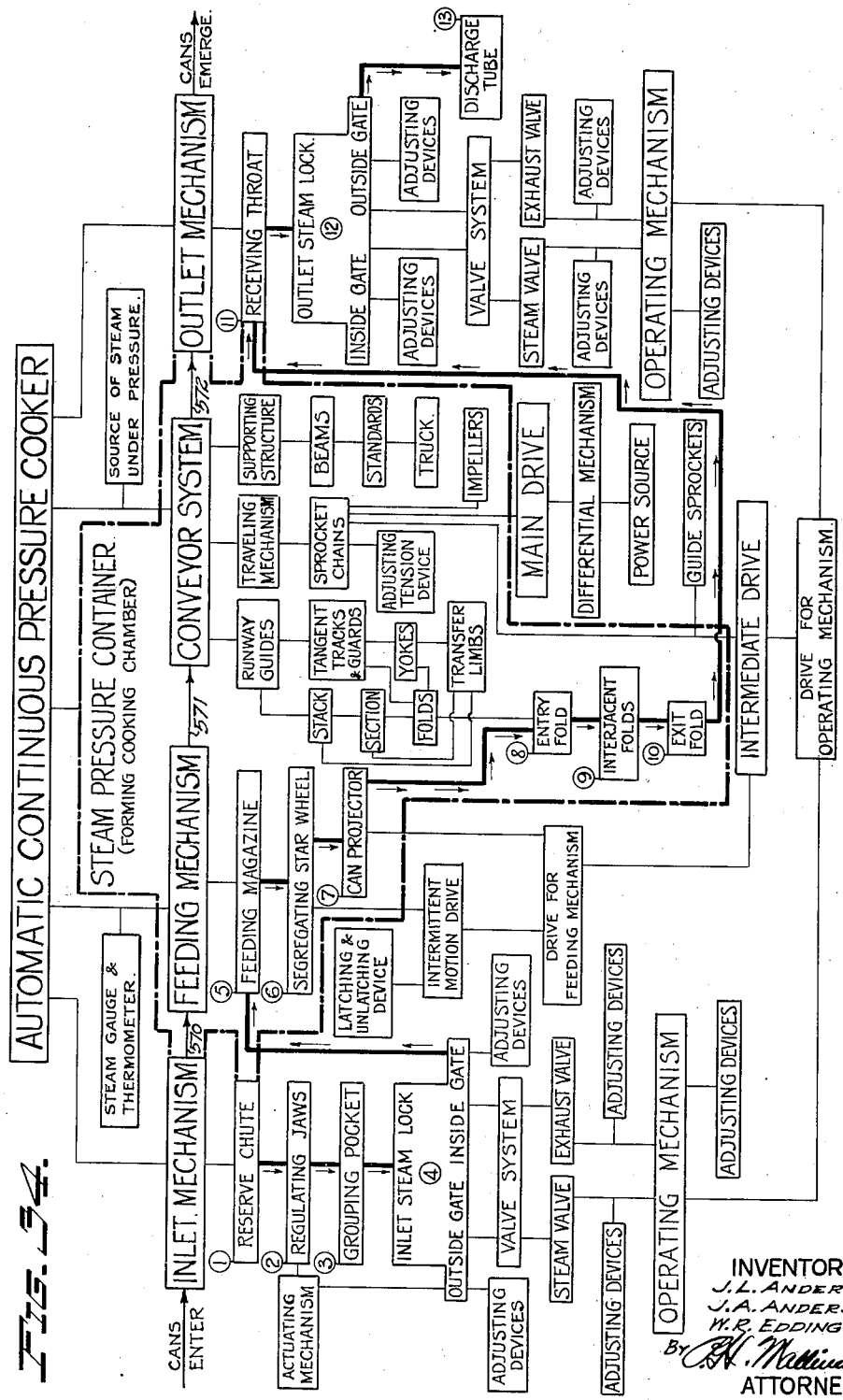

Patented May 26, 1925.

1,539,793

UNITED STATES PATENT OFFICE.

JOHN L. ANDERSON, OF OGDEN, AND JAMES A. ANDERSON AND WILLIAM R. EDDINGTON, OF MORGAN, UTAH.

AUTOMATIC CONTINUOUS PRESSURE COOKER.

Application filed August 27, 1923. Serial No. 659,548.

*To all whom it may concern:*

Be it known that we, JOHN L. ANDERSON, JAMES A. ANDERSON, and WILLIAM R. EDDINGTON, all citizens of the United States, the first-named, a resident of Ogden, in the county of Weber, and the two last-named, residents of Morgan, in the county of Morgan, all in the State of Utah, have jointly invented a certain new and useful Automatic Continuous Pressure Cooker, of which the following, together with the accompanying drawings, constitutes a full, clear, and exact specification, such as will enable others skilled in the art to which it appertains to make and use the same.

This invention relates to an automatic, continuous cooker for canned foods or other products, but especially for those requiring cooking in sealed vessels such as ordinary tin cans, under fluid pressure, such as steam, greater than atmospheric pressure.

The principal objects of the invention are to provide an automatic machine which shall:

First. Be adapted to receive without interruption, one or more single files of cans as they come from the capping machines, thus conforming to the accepted method of handling cans in modern canning factories.

Second. Allow the cooking of several different kinds of goods simultaneously.

Third. Permit the constant rolling of the cans for agitating the contents, thereby promoting the even and gradual heating of the contents.

Fourth. Allow the passage of the cans therethrough in continuous procession along a circuitous line of travel of sufficient length for exposing the cans to the cooking atmosphere, the requisite length of time to insure thorough cooking of the contents of the cans.

Fifth. Propel the cans through their entire course of travel in a positive manner, so that there shall be no "loafing", jamming, nor mutilating of cans en route.

Sixth. Accomplish the ingress and egress of cans with a minimum loss of steam.

Seventh. Have a system of balanced gates, whereby undue stress and waste of power, when working against fluid pressure, shall be eliminated.

Eighth. Have the gates adapted for an instantaneous make-and-break contact on an elastic bearing, thereby assuring a perfect closure, and by eliminating sliding contacts, render lubrication in the path of cans, unnecessary.

Ninth. Keep cans free from contact with lubricants at all points of travel through the machine.

Tenth. Eliminate the personal factor as regards time of cooking, every can being heated in accordance with a predetermined program.

Eleventh. Allow factors, which in other methods of cooking, are subject to variation, to be brought to a positive basis of predetermination.

Twelfth. Be equipped with means for accurately adjusting movable parts, and with means for taking up, or compensating, the "lost motion" in those parts mostly subjected to stress and wear.

Thirteenth. Have all parts readily accessible for inspection and repair.

Fourteenth. Render personal attendance unnecessary, excepting to keep a general supervision over a group of machines.

In order to point out clearly the advantages accruing through the use of this invention, over methods hitherto in vogue for handling canned products which must be cooked under a pressure different from the pressure of the atmosphere, it is considered pertinent to briefly describe typical present-day practice and equipment for this purpose, as it exists in some of the largest and most modern canning factories.

In the best practice, the cooking equipment consists of a plurality of heavy stationary retorts usually made of cast iron, and set permanently in a floor, in positions spaced along the arc of a circle, about 30 feet in diameter. The retorts are cylindrical in shape, provided with heavy hinged covers, and are set with their axes vertical. Ordinarily, the capacity of each retort is about 1200 cans of average size, which may be placed in metal baskets, there being usually three baskets, each holding about 400 cans, to each retort.

At the center of the circle of which the retort arc is a part, is stationed a jib crane arranged to swing over the retorts, this crane being provided with an electric hoist mounted on a trolley for serving the retorts. Each crane may serve about fifteen retorts.

In using the retorts, the cans are first loaded into the baskets by hand, in a working space to the rear of the crane; the loaded baskets are picked up by the crane, one by one, and carried to the proper retort. The cover of the retort is lifted by hand, and when the three baskets of cans have been properly placed in the retort, the cover is lowered and the clamps thereof tightened by the workmen. Steam is admitted to the retort to the proper pressure, as indicated by its individual gauge, and the cans are left to cook the required time. All the retorts are charged successively in a similar manner, and while some are cooking, other retorts are being charged or emptied. By the time the crane has made the circuit of all the retorts, the first one charged, will be ready to have its cans removed. For this purpose, the crane must again be swung over the first retort, the steam pressure exhausted therefrom, the clamps holding the cover, unfastened, and the cover raised by the workmen. The baskets of cans must then be lifted out one by one, by the crane, dipped in a trough of cold running water, and the cans removed from baskets by hand. The retort is then charged again with a fresh lot of cans and the cover lowered and clamped. These operations are continued in succession with all the retorts, and indefinitely repeated.

An endeavor is made to correctly time the cooking in each retort, but it can readily be seen that this timing is necessarily a haphazard proceeding, and it occasionally happens, in the hurry and bustle of the short canning season and the stressed conditions under which the workmen labor, that mistakes are made, causing the contents of some of the retorts to be only slightly cooked, and others to be overdone, while at best, the results only approximate the desired standard.

Improper cooking impairs the keeping qualities of the product, and results in a certain percentage of complaints from the consumer, with attending unpleasantness and loss.

A further disadvantage is the fact that the cans are all stationary within the retorts, so that the contents of the cans are not agitated while cooking, thus causing an uneven heating of the contents from the outside of the cans inwardly, and in order to heat the contents sufficiently at the centers of the cans, a longer time is required than would be the case if the contents were agitated while cooking; at the same time, the contents near the outside of a can, are subject to overheating.

It is evident that this method of handling the cans is exceedingly cumbersome, and that the equipment occupies much floor space.

In all canneries, large and small, the uniform cooking feature afforded by a machine constructed in accordance with the present invention, is highly desirable, and in the larger canneries, the saving in labor and in floor space, which may be realized, are items of considerable importance.

In stating broadly the manner in which we attain the objects previously outlined, a container, normally impervious to a fluid under a given pressure, is provided, preferably in the form of a circular, cylindrical shell of suitable length, with heads which may be removably secured to the ends thereof.

Internally of the container is located a can conveying system, preferably arranged in longitudinal relationship to the container, and embracing a runway following a circuitous course, of a length such that when taken relatively to the speed with which the cans travel through the runway, the cans will be exposed to the influence of the atmosphere within the container, a predetermined length of time.

A propelling mechanism is provided having individual impellers extending through the runway, and carried by endless, flexible traveling members which follow closely the general contour of the runway, the traveling members receiving their motion from a source of power outside of the container.

A feeding mechanism is also located inside the container and in proximity to the entry to the runway, so that the conveyor shall be uniformly loaded and the cans be placed between successive impellers.

In order to transfer cans from the outside of the container to the feeding mechanism, an inlet mechanism is provided, which consists of a lock which at one time confines a steam pressure equal to that inside the container, and at another time, an air pressure equal to that of the atmosphere, the steam pressure and air pressure confinements alternating with each other. Provision is also made to embody means for automatically opening and closing the lock in accordance with a cycle of predetermined timing, means for admitting cans to the lock at one point of the cycle, means for releasing the cans from the lock at another point of the cycle, and means for conducting the cans from the lock to the feeding mechanism.

There is provided, further, an outlet mechanism for transferring cans from the conveying system to the outside of the container, the construction and operation of which is in general, similar to that of the inlet mechanism the exact points of difference becoming evident, later in this specification.

The arrangement of the conveyor runway together with the mechanism for propelling the cans through the runway, forms an important part of the present invention.

The purpose of the runway is to support, confine and guide the traveling cans, and to this end may comprise angular rails disposed at the four corners of a rectangular cross-section, in a manner to form parts of four planes intersecting each other in pairs, preferably at right angles to each other. The confining planes are preferably so spaced apart from each other, that the cans may roll freely along the longitudinal dimension of the runway, but that any undue displacement of the cans in any direction transverse to the runway, will be prevented.

Within the container, the space is valuable, so it is desirable to use it economically, which means that the actual runway space shall equal as great a proportion of the total container space as possible.

We accomplish an economy in this direction, by arranging the runway in a succession of back and forth folds, extending, directionally considered, in an over and return relation to each other and to the point at which the cans are fed into the runway. This forms what may be called a "section of folds". A plurality of such fold sections may be employed, and the over fold portion of one section may be joined to the return fold portion of another section, or vice versa, by means of a transfer limb portion corresponding in cross-section to the runway cross-section. Thus, traveling cans may be transferred from one section to another without interruption.

By means of this arrangement, the continuity of a long, circuitous runway may be established, and further, by making the spaces between successive folds as small as possible, and by placing consecutive fold sections closely adjacent or adjoining each other, the space occupied by the runway may be brought within very compact limits.

This arrangement of the runway lends itself also, to a favorable combination with a propelling mechanism having impellers for urging the cans through the runway, besides affording an opportunity for the advantageous disposition of a framework for supporting both the runway structure and the propelling mechanism.

The runway, in folds and sections of folds, as just described, constitutes what may be called a "stack" and by placing two or more stacks side by side, a multiple unit may be formed. The various runways making up the unit may be served in common by a single propelling mechanism. This is of great advantage, because in many canning factories, a number of different brands of goods are run through the plant simultaneously. Especially is this the case with peas, owing to the peculiar conditions usually surrounding this product. Peas are all harvested and threshed at one time, so that pods in various stages of development or maturity, are present. This results in the classification of the product according to size, and ordinarily a factory will can as many as eight different sizes. It is therefore desirable that one machine should handle several different kinds at one time, thereby reducing the number of separate machines required.

The machine exemplified in the present instance, embodies a "twin" unit.

Novel features of operation are made possible by the construction just touched upon, and these features will presently be emphasized.

The flexible traveling members may consist of two endless sprocket chains operatively disposed on either side of the runway unit, the pitch lines of the chains following closely the contour of the center line of the over folds, return folds, and transfer limb portions. For each chain, at the bends where the movements of cans passing through the folds change direction, are placed guide sprocket wheels, one or more of which may be utilized, if desired, for driving the respective chain.

The sprocket wheels may be rigidly mounted in pairs on shafts, and where more than one drive shaft is used, a differential mechanism for dividing and equalizing the stress among the different shafts, should be included.

The impellers are spaced apart from each other equally along the length of the sprocket chains, and serve as ties between the two chains. The impellers are preferably made of metallic tubes, journaled on rods whose extremities pass through links of the sprocket chains in place of the usual pins. The impellers, further, extend transversely through the spaces between the angular rails, thereby, when in motion, sweeping through the entire course of the runway or runways, as the case may be, and urging the cans before them.

Provision may be made for adjustably stressing the traveling sprocket chains under an initial tension, and for taking up the wear thereof. Provision is also made for simultaneously adjusting the length of the particular folds affected by the chain adjustments, so that the contour of the center lines of the runway sections superposed one upon another, shall always substantially coincide with the endless contour of the pitch line of the sprocket chains.

In order to cause the positive entry of the cans into the conveyor, we employ what we choose to call a "can projector," which may consist of a constantly rotating friction wheel, adapted to contact the cans under spring pressure, and to roll them forward from the star-wheel into the conveyor gaps. This forms part of the feeding mechanism.

The exit of the cans from the machine, is regulated by the discharge gates which are designed to handle the cans in groups, intermittently, similar to the inlet gates. The fact that groups of cans are handled intermittently, does not change, in result, the continuous feature, so far as the effect on the lines of cans going to, or coming from, the machine, is concerned.

In the drawings:

Fig. 1 represents a longitudinal vertical section lying partly in the center plane and partly in the planes indicated by line 1—1 in Fig. 3, a portion of the conveying system being shown in elevation;

Fig. 2, a side elevation of the two end portions of the machine, drawn to a scale somewhat larger than used in Fig. 1, the intermediate body portion having been broken away, for convenience;

Fig. 3, the front elevation, drawn to the same scale as Fig. 2, parts in the background omitted;

Fig. 4, a section taken on line 4—4, Fig. 1, also drawn to the scale used in Fig. 2, parts in the background omitted;

Fig. 5, a fragmentary section taken on line 5, Fig. 4, but with cans in runway;

Fig. 6, a side elevation fragment, largely in section, and substantially identical with the portion outlined at 6 in Fig. 1, though considerably enlarged to show the details of the inlet mechanism and feeding mechanism;

Fig. 7, a side elevation, as seen in the direction of the arrows, of the fragment indicated by line 7—7 in Fig. 3; and at the same time, a reflected view from the direction opposed to the arrows, considering the line 7—7 to represent a mirror plane;

Fig. 8, a section on line 8, Fig. 6, parts in the background omitted;

Fig. 9, a diagram illustrating movements of inlet gates, outlet gates and related valves;

Figs. 10 and 11, fragmentary elevations, enlarged, showing details of feeding mechanism; Fig. 10, partly in section.

Fig. 12, a section taken on 12—12, Fig. 6;

Fig. 13, a section, on line 13, Fig. 12, considerably enlarged;

Figs. 14 and 15, elevations of parts lying in front of planes 14 and 15 respectively, in Fig. 6;

Fig. 16, a development of the section indicated by the line 16 in Fig. 6;

Fig. 17, an enlargement of substantially the portion enclosed by line 17 in Fig. 7, parts in the background omitted;

Figs. 18 and 19, sections taken respectively on the lines 18 and 19 in Fig. 17;

Fig. 20, the rear elevation, parts in the background omitted;

Fig. 21, the rear elevation without cover and partly in section on line 21 in Fig. 1, portions in the background being omitted;

Fig. 22, a vertical section lying in the center plane, of the portion enclosed by the broken line 22, in Fig. 21;

Fig. 23, a section on line 23, Fig. 22;

Fig. 24, an enlarged detail, showing method of connecting impellers to sprocket chains;

Fig. 25, an enlarged section taken on line 25 in Fig. 1;

Fig. 26, a perspective diagram of the runway sections with folds constituting one stack;

Fig. 27, a perspective diagram of one of the sprocket chains with guide wheels, as arranged to follow the contour of the fold sections of the runway;

Fig. 28, a fragmentary section, enlarged, taken on line 28 in Fig. 21, with cover in place, and showing some parts in alternate positions;

Figs. 29 and 30, details, in enlarged perspective of runway take-up yokes, seen in the directions of the arrows 29 and 30, respectively, in Fig. 33;

Fig. 31, details, in perspective, drawn to a scale somewhat smaller than the two preceding figures, of take-up brackets with portions of associated parts, as seen in the direction of arrow 31, in Fig. 33.

Fig. 32, details in enlarged perspective, of aligning bracket and associated parts, as seen in the direction of the arrow 32, in Fig. 33;

Fig. 33, a section on line 33 in Fig. 1; and

Fig. 34, a constitution diagram, showing the relations of the principal parts of the machine to each other.

Referring to the drawings, 40 represents the shell of the cooking container supported on the legs 41, which may rest on the floor 42. The shell 40 may carry the circumferentially flanged ring 44 at one end, and a similarly flanged ring 45 at the other end thereof. The ring 44 may be faced and bored to receive the rear head 46, while the ring 45 may similarly receive the front head 47. Each of the heads 46 and 47 may have a spigot flange 48 to fit the bored portions of rings 44 and 45, respectively, and the heads 46 and 47 may be securely fastened to the flanges of the respective rings, by means of bolts 49. The front head 47 may be utilized to support the operating mechanisms of the machine while the conveyor system may be supported principally within the cooking compartment 50 of the container, and the conveyor drive, by the rear head 46. The neck 86 may be formed integrally with the head 46, thus providing a recessed portion 51, for accommodating the rear parts of the conveyor system. In a similar manner, the front head 47 may have the integrally formed main neck 74, providing the recessed portion 75, for accommodating the extreme front parts of the conveyor system.

In proceeding with the description of this invention, it will be advantageous to divide the subject matter thereof, into the four principal parts indicated on the constitution diagram (Fig. 34), namely, the inlet mechanism, the feeding mechanism, the conveyor system, and the outlet mechanism. For convenience, the conveyor system will be described first, and then in order, the inlet mechanism, feeding mechanism, and outlet mechanism.

Conveyor system.

The conveyor system embraces the traveling mechanism with its appurtenances, the runway guides, and the structure by which these are directly supported.

*Traveling mechanism.*—The traveling mechanism (Figs. 1, 5, 23, 25, 27 and 28) follows the runway contour, presently to be described, and has the two endless sprocket chains 52, 52, which receive their motion from the drive sprocket wheels 53, 53, and 57, 57, rigidly mounted on the drive shafts 63 and 67, respectively. The sprockets 53, 53 and 57, 57, also serve as guide wheels, and the chains 52, 52, further, pass around other guide sprocket wheels 54, 54, 55, 55, 56, 56, 58, 58, 59, 59, 60, 60, and 61, 61, these being mounted in pairs respectively, on the shafts 64, 65, 66, 68, 69, 70 and 71. All the shafts with their sprocket wheels, are placed so the conveyor chains 52 will follow the runway folds and bends, the exact arrangement of which will be described in connection with the runway.

The drive sprocket 53, 53, and 57, 57 are rigidly mounted on the drive shafts 63 and 67 respectively, (Figs. 1, 2, 21, 22, 27 and 28) these being journaled in the bracketed boxes 72, which may be secured to the end standards 73, by bolting. For convenience in assembling or dismantling, the drive shafts 63 and 67 may have detachably coupled thereto, the stub shafts 82 (Figs. 20, 21, and 22). The couplings may consist of the heads 80, having, for instance, a square cross-section (Figs. 22 and 23), and being integral with the shafts 63 and 67. The heads 80 may fit loosely into the sockets 81, which may be rigidly mounted on the stub shafts 82. Shafts 82 are journaled in the stuffing-boxes 83 and the plain boxes 84, the former constituting integral parts of the brackets 87, while the boxes 84 may be separate from the brackets, but be rigidly mounted thereon. For the purpose of readily detaching the shafts 82 from the shafts 63 and 67, and also for convenience in manufacturing, the brackets 87 may be made separate from the neck 86, and be rigidly attached thereto, by means of bolts 151.

Glands 88 may be used to make steamtight joints around the shafts 82. Recessed portions 89 and 90 may be formed in the neck 86 for accommodating the sockets 81.

Sprocket wheels 85, keyed to the shafts 82, are arranged for receiving motion from the sprocket pinions 152 (Figs. 2 and 20) by means of the chains 153 and 154, the pinions 152 being mounted on the shafts 155 and 156, and these being journaled in the bearings 157. Bearings 157 are mounted on a frame composed of beams 158 and beams 159, the latter resting on the brackets 160 rigidly attached to the shell 40 of the container. Shafts 155 and 156 may be connected to each other by any well-known differential mechanism (indicated in Fig. 2) preferably located within the pulley 161, the latter being connected by means of a belt 162 to any convenient source of power.

Shaft 64, 66, 68, 70 and 71, are journaled in bearings 163 (Figs. 2 and 4) which are carried by the walls 76 of the front head 47. Flanges 164, secured to the bearings 163, are provided with stuffing-boxes, these being fitted with the glands 165 for making steamtight joints around the shafts 64, 66, 68, 70 and 71. The shaft 71 is utilized to transmit power motion to the various mechanisms which are supported by the front head 47, and which will be described in detail in appropriate places hereinafter. For this purpose, the shaft 71 (Figs. 2, 3, 4 and 11) is extended at each end, beyond the glands 165, and is carried in bearings 77 formed in the outboard brackets 166.

The pitch of the conveyor chains 52 is selected with regard to the diameter of the largest cans that are to pass through the machine, because it is convenient to place the impellers at pivotal points of the links of the chains. The pitch of the impellers may therefore be equal either to the pitch of the chains, or to a multiple thereof. In the present instance, the pitch of the impellers is equal to twice the pitch of the chains, and the pitch of the impellers, minus the outside diameter thereof, is somewhat greater than the diameter of the cans 170. The sprocket wheels are so arranged that the corresponding pitch points of the two chains, shall be directly opposite each other, transversely across the machine, and when in motion, to travel in step with each other.

The impellers are made up of round tubes 107 journaled on rods or axles 108, which latter extend from one chain across to the other. The two ends of the axles project through the individual links 518 (Fig. 24) of the chains, and are fastened by means of cotter keys 78 in the same manner as are fastened the usual link pins 79. The ends of the impeller tubes 107 are fitted with the bushings 109, these being preferably made of an anti-friction metal such as bronze, forced tightly into the tubes, but bored to turn freely on the axles 108. The impellers act also as ties and rolling supports for the two chains, and have their bearings on the track angles 148 (Fig. 22) while the guard angles 149 prevent displacement upwardly. There is sufficient clearance (not shown) between the angles 148 and 149 to allow the free movement of the impellers between them.

Means for tightening and tensioning the chains, and taking up the wear thereof, are provided by mounting the shafts 65 and 69 in bearings 91 (Figs. 1, 21, 28, 31 and 33) which may form integral parts of the bracketed end pieces 92, the latter being slidably mounted on the pins 93. The pins 93 are rigidly secured in bosses 94, forming integral parts of the end standards 73. The bracketed end pieces 92, together with the beams 98 and 99, rigidly secured thereto, form carriages, the purpose of which will presently be explained. The carriages may be adjusted by means of the stems 97, which may be secured to the bearings 91, by threading one end in the bosses 95 and locking therein with the nuts 96. The other end of each stem 97 may be threaded to receive a handwheel 100. The handwheels are designed to bear on the compression springs 101, and the reactions of the springs are taken against the yokes 102, these being rigidly fastened to the cover 103 (Figs. 1, 2, 20, 28 and 33). The cover makes a tight closure for the container, and is fastened to the flange 43, by means of bolts 62. In order to make steamtight joints around the stems 97, stuffing-boxes 104, forming integral parts of the cover 103, and fitted with glands 105, may be provided.

The perspective diagram, Fig. 27, of the chains 52, shows at a glance the endless arrangement of the chains in entirety, as well as the locations of the drive and guide sprocket wheels, and the arrow points indicate the directions of travel in the various parts of the chains.

*Runway guides and supporting structure.*—In the present embodiment, the runway guides are formed chiefly of steel angles and T's which make up the straight or tangent portions thereof, and are so disposed that the runway, in cross-section, which is rectangular, shall have an angular bearing or guide at each of the four corners of the rectangle. This provides a pair of planes intersecting each other, at each corner, as shown in Fig. 25, where 167 and 168 represent track angles, and 169 track T's, on the horizontal flanges of which, the rims of the cans 170 may roll, while the stems of the angles and T's confine the cans laterally with sufficient clearance to allow their free passage. The cans are prevented from any undue lifting from the track flanges, by the angles 171 and 172, and the T's 173, all disposed as guards, above the cans.

It should be understood that while, in the present position of the machine, the angles 167 and 168, and the T's 169, act as track members, and the angles 171 and 172, and the T's 173, as guard members, yet it is convenient to refer to them collectively as "runway guides."

The fundamental purpose in this invention, of securing great length and continuity for the runway, in a space as compact as possible, is achieved by arranging the runway guides in a succession of back and forth laps, or what we choose to call "folds," indicated at 110 to 141 (Figs. 25 and 26), which extend over, and return upon themselves, alternately, and which we have chosen, further, to call "over folds" and "return folds." The word "over" is here used to designate the direction of travel away from the front, or feed end, of the machine, while the word "return" designates the opposite direction, or travel towards the feed end.

In the present embodiment, the individual folds are first of all arranged in sections or tiers, which include the alternating over folds and return folds located one above another in substantially vertical alignment. A certain plurality of these sections, such as *a*, *b*, *c*, *d*, may be arranged adjacent or adjoining each other, to form a stack which completes an independent runway unit. Multiplying the stacks in an individual machine, produces multiple units, and as the present embodiment is a twin unit, there are two stacks, "A" and "B," these being shown in transverse section in Fig. 25. For clearly indicating the method of building up the folds into sections and the sections into stacks, stack "B" is shown in diagrammatic perspective in Fig. 26. The stacks "A" and "B" are located on either side of the center line 150, and for convenience in operating the gate system, are arranged in right and left relation to each other. The fold sections "*a*" comprise the folds 110 to 117; sections "*b*," the folds 118 to 125; sections "*c*" the folds 126 to 135; and sections "*d*," the folds 134 to 141.

For the sake of simplicity of construction in supporting the runway guides, and to harmonize the arrangement thereof with the design of the traveling mechanism, the corresponding folds of the various sections are arranged in horizontal alignment with each other, forming decks designated by the letters *m*, *n*, *p*, *q*, *r*, *s*, *t* and *u*, which may be called "over decks" and "return decks" in agreement with the nature of the folds composing each particular deck. In Fig. 25, the folds 110, 118, 126 and 134 form one deck; the folds 111, 119, 127 and 135, another deck, and so on.

The runway guides composing the various decks, may be carried by the upper and lower cross beams 174 and 175 respectively, and by the intermediate beams 176, forming parts of the supporting structure. The beams 174 and 175 are supported by the standards 73 and 146 (Figs. 1 and 25) while most of the beams 176 may also be carried by the standards 73 and 146. Those of the beams 176, however, which are located near the extreme front end of the container, are supported on the flanges 147, forming parts of the head 47.

In order to establish the continuity of the folds 110 to 141 from one fold to another, as a single runway, the various guide members forming the tangent parts of these folds, and which have already been referred to, are connected to each other, as particularized following: Regarding first, the rear ends of the folds, then beginning with decks $m$, $n$, $r$ and $s$, guide members 167 are connected to guide members 171, by yoke portions composed of the inner parts 177 and the outer parts 178; guide members 168 are connected to guide members 172 also by yoke portions composed of similar parts 177 and 178; the guide members 169 are connected to guide members 173 by yoke portions composed of the inner parts 179 and the outer parts 180 (Figs. 4, 5 and 21). It will be observed that the only differences between yoke parts 177 and 179, and between yoke parts 178 and 180, are the differences between offering single track facilities or double track facilities, respectively. The various yoke parts are semi-circular in shape, and are concentric with the respective shafts carrying the sprocket wheels of the conveyor proper. The various yoke parts, further, are rigidly fastened to the respective guide members for which they form the connection.

In order to make possible the lengthening of the folds 112, 113, 120, 121, 128, 129, 136 and 137 (Fig. 25), and also the folds 116, 117, 124, 125, 132, 133, 140 and 141, simultaneously with the adjustment of the sprocket chains for taking up slack and wear, already referred to, it is necessary to provide specially designed yoke portions (Fig. 29) composed of the inner parts 181 and the outer parts 182, which are rigidly mounted, respectively, on the beams 98 and 99, and operatively associated with the runway guide members 169 and 173 in the decks "$p$" and "$q$", and "$t$" and "$u$", as shown in Fig. 28. These guide members, 169 and 173, do not extend quite as far towards the rear of the machine, as do the corresponding guide members in the decks "$m$", "$n$", "$r$" and "$s$". As shown in Fig. 29, the guide member 169 in deck "$t$", has its stem split vertically, and opened out to form a bifurcated portion having the legs 183, which slidably straddle the tongue 184 of the inner yoke part 181, and are in longitudinal alignment therewith. Similarly, the tongue 185 of the outer yoke part 182, is engaged by the legs 183—1 of the guide 173 in deck "$t$". The lower extremity of the outer yoke parts 182 is bifurcated to form the legs 186, which slidably straddle the stem 187, forming a tongue on the guide 169 in deck "$u$". Also, in deck "$u$", the legs 188 form a bifurcated lower extremity of the inner yoke part 181 and slidably straddle the stem 189, forming a tongue on the guide 173 in deck "$u$". Now, it will be remembered that the beams 98 and 99 are rigidly connected to each other at their ends by the bracket pieces 92, to form a carriage, and that the bearings carrying the shaft 65, form part of this carriage, so that, as the bearings are moved in or out, the shaft 65 and the yoke parts 181 and 182 move simultaneously, as a unit.

A can 170, rolling in the runway guides, proceeds in the directions shown by the arrows, and it will be noticed that the bifurcated portions of the yokes, in conjunction with the tongues of the runway guides, as described, virtually form telescoping joints, also that these joints in the decks "$p$" and "$q$" are arranged in directions opposed to each other. The purpose of this is to present the gradually tapering rear portions of the legs 183, 183—1, 186, and 188 to the contact of the oncoming cans 170, in order that the cans shall run over the joints instead of running against the joints.

As the telescoping joints are extended, there will be formed gaps 190, between the track flanges of the yokes and the guide members. The flanged rims of the cans rolling on the track flanges, would drop into these gaps, so, in order to obviate this objectionable feature, bridge plates 191 are rigidly attached to flanges of the beams 98 and 99. These bridge plates extend sufficiently far over the beams 175 and 176, to provide the maximum travel allowed for the adjusting carriage. It will be noticed that the bridge plates 191, are made somewhat thicker than the track flanges of the guide members, this being done so that there shall be no jarring of the cans as they cross the gap. Owing to the fact that the body of the can, which is the portion that contacts the plates 191, is smaller in diameter than the diameter of the rims of the cans, the cans will roll smoothly across the gaps.

Part of the details represented in Fig. 30 are substantially similar to those just described, but in other parts, variations in construction are necessary in view of the fact that the guide members 167 and 171 are of the single track type, and hence are made of angles instead of T's, and also because provision must be made for an extensible continuation of the impeller track members 148. The angular inner yoke part shown at 192, is rigidly attached to beam 98. To the side of the yoke part 192, is rigidly attached the bar 193, having the forwardly extending arm 194, which is offset to form a space adapted to receive the narrowed end portion 195 of the impeller track angle 148. The vertical leg of the can track angle 167, has its end portion 196 offset, so as to form a space betwen it and the end portion 195 of the angle 148, for receiving the tongue 197 of the inner yoke part 192. Thus is formed a single track telescoping joint which in general operating effect is similar to the double track telescoping joint previously described. The top surface of the bar 193 and its arm 194, in the same plane with the top of the impeller track angle 148, forms a smooth continuation for the bearing of the rolling impeller tubes 107. Single track outer yoke parts 198 (Fig. 21), though not shown in detail, correspond in construction to the inner yoke parts 192, and have similar engaging detail parts. The single track guide angles 168 and 172 (Fig. 25), in decks "$p$" and "$q$", and "$t$" and "$u$", have telescoping extensible yokes similar to those just described, omitting, of course, the impeller track extension bars 193.

The legs 183, 183—1, 186 and 188, shown in Fig. 29, and the leg 196 shown in Fig. 30, should be made as thin as possible consistent with strength, so that the runways may be made of minimum width without bringing about any pinching of the cans as they pass through the constricted spaces in the runways between telescoping joints.

In Fig. 28 the adjusting or tension carriage with its shaft 69 and the accompanying parts, in decks $t$ and $u$, is shown in an alternate position, spaced apart from the standard 73, clearly indicating how the operating parts of the runway are maintained in fixed relation to each other at all points of travel of the carriage. Fig. 28 shows that the sprocket chain 52 may always be maintained under any reasonable tension, by tightening the hand wheels 100 against the compression springs 101, whereby these latter will be caused to exert constant stresses on the stems 97, which of course, are transmitted to the adjusting carriages.

For the purpose of holding the various outer yoke portions, which are located on the same general level, in a spaced and braced relation to each other, brace bars 199, rigidly fastened to each individual yoke part, are provided.

Proceeding now to the front end of the machine (Figs. 1, 4, 5 and 6), the folds of deck "$n$" are connected to the folds of deck "$p$"; the folds of deck "$q$" to deck "$r$"; and the folds of deck "$s$" to deck "$t$", by the outer yoke parts 180 and 178, and the inner yoke parts 179 and 177, in exactly the same manner as has been described for the folds at the rear of the machine.

The continuity of each runway so far as the individual folds of the sections are concerned, has been demonstrated. Now, to establish the continuity of the runways from section to section, refer to Figs. 4, 5, 25 and 26. The lowermost folds 117, 125, and 133, of sections $a$, $b$, and $c$, are connected respectively to the uppermost folds, 118, 126, and 134, of the sections $b$, $c$, and $d$, by means of the inclined transfer limbs 142, 143, and 144, defined by the T-bars 200 and 201. These transfer limb members constitute guides for cans 170, as shown particularly in Figs. 4 and 5. T-guides 200 are rigidly connected to the uppermost guide members of deck "$m$" and to the lowermost guide members of deck "$u$" by means of the connecting outer elbows 202, while the T-guides 201 are rigidly connected to the lowermost guide members of deck "$m$" and to the uppermost guide members of deck "$u$", by means of the inner connecting elbows 203. The plurality of elbows 202 and plurality 203, are concentric with the corresponding sprocket shafts 70 and 71, and the individual elbows of each plurality are spaced apart from each other a passage distance equal to that maintained in the other portions of the runway.

Brace bars 204 and 205 (Figs. 1 and 6) extend across the machine laterally, to tie and to brace the various runway sections and transfer limbs to each other. Bars 204 and 205 are held apart from each other by the spacing thimbles 145, and rivets with countersunk heads may be used to join the parts to each other.

The fold 110, in each of the stacks "A" and "B", may be referred to as the "entry fold" because it is the fold which the cans enter from the feeding mechanism, and the first fold traversed by the cans. In an analogous way, the folds 141 may be called the "exit folds", because they are the last folds traversed by the cans, and the folds from which the cans are expelled into the receiving throats of the outlet mechanism.

In Fig. 25, may be seen the relation between the impellers, indicated at 107, the runway guides of the various decks, and the conveyor chains 52. In this figure, for the purpose of showing diverse details clearly, the impellers in some of the decks are shown in front of the cans, and in other decks the cans are shown in front of the impellers; in still another deck the impellers are shown in section. It is to be noted that the planes in which the axes of the impellers move, practically coincide with the horizontal center planes of the various decks, and also that these planes are very close to the horizontal planes passing through the axes of the cans. Therefore, the impellers, in imparting motion to the cans, contact the latter at the most effective points, that is, where a right line representing the path traveled by the centers of the impellers, passes substantially through the centers of the cans, and further, that these points lie in the rims of the cans. The rims are much the strongest parts of the cans, in a direction transversely thereof, and the bodies, which latter offer the least resistance to distortion, in this direction, are thereby protected. Each impeller may act simultaneously on eight cans, four of the cans being in stack "A", and four, in stack "B". From the sections "a", the cans are gradually drawn along the impellers, in moving through the transfer limbs from section to section, until they reach the sections "d" located adjacent each other at the central part of the machine, so that the cans in the exit folds 141, of the stacks "A" and "B", travel in paths adjacent, and parallel to, each other, these paths leading to the twin discharge gates of the outlet mechanism, later to be described.

In the diagram (Fig. 26) is visualized the path described by the center point of a can from the time of its projection into the entry limb at the point 206, during its travel through the consecutive folds with their connecting yoke portions, then from section to section, through the transfer limbs with their connecting elbows, until the can is finally expelled from the exit limb 141, at the point 207. In this diagram, the distances between the vertical center planes of the fold sections $a$, $b$, $c$, and $d$, are greatly exaggerated on purpose so that each section can be shown in a clear space without confusedly overlapping another section. Hence, the lines 200—201, representing the transfer limbs are shown inclined from the vertical, much more than is actually the case.

The runway convolutions of each stack, as described, may be said to constitute a separate "cooking zone", though the cans in each zone receive their motion from a propelling mechanism, common to both zones.

Referring again to Fig. 25, it should be stated that the track angles 148 on which the impellers roll, and also the guard angles 149 above them, are rigidly attached to the runway guide angles 167 and 171, respectively. The angles 148 and 149 extend only to the yoke portions, as the bearings of the chain links between the teeth of the sprocket wheels, are positive supports for the chains, in passing around the wheels. Therefore, it is not necessary to have counterparts for the impeller track angles 148 and guard angles 149, on the yoke portions of the runways.

In order to prevent any undue lateral displacement of the conveyor sprocket chains 52, and of the impellers, side guard angles 208 are provided, these being rigidly attached to the standards 73 and 146, which sustain the principal parts of the conveyor system, as previously explained.

The standards 73 and 146 may all be supported on the cantilever stub beams 209, which are framed into the longitudinal girders made up of channels 210 and 211, and joined thereto by connection angles 212. The channel girders are tied to each other by the intermediate beams 213, through the connection angles 214. Between the channels 210 and 211, which are spaced apart from each other, may be placed the truck wheels 215, journaled on axles 216, for carrying the conveyor system with its supporting structure, and the front head 47 with all its operating mechanisms. The truck wheels 215 are arranged to travel on the rails 217, the latter being supported on stools 218, which may in turn be riveted to the shell 40 of the container. The forward part of the girders 210—211 may be rigidly fastened to the head 47 by means of the connection angles 219. To the front of the head 47 may also be rigidly connected, the brackets 220, these being provided with forked ends for receiving the axle pins 511, on which may be journaled, the flanged pilot wheels 512. The pilot wheels are arranged to travel on the rails 513, the latter being supported by the beams 514, which are held in spaced relation to each other, by connections, such as beams 521. The beams 514, with their rails 513, are intended only for temporary use at such times when it may be desired to remove the conveyor system from the container. Normally, the beams 514 may be taken away from the machine entirely and placed in storage, so that the floor space in front of the machine, shall be left clear of any obstructions.

By removing the bolts 49 from the flange 45 and the front head 47, and also removing the hand wheels 100, the entire conveying system may be bodily withdrawn from the cooking chamber, for purposes of inspection, cleaning, or repair. The beams 514 and rails 513 extend forwardly a sufficient distance to allow this withdrawal to the proper extent.

When the conveyor system is to be returned to its place in the container, it is desirable to have means for automatically aligning the rear end of the conveyor structure with certain points of the rear head 46, in order that the operating parts on the movable structure shall accurately resume the running positions with the co-acting operating parts on the stationary structure. For instance, the adjusting stems 97 should be accurately replaced in the stuffing-boxes 104. Without special provision for such aligning, this task would not be easily accomplished, owing to the bulky nature of the machine. To bring about the accurate alignment desired, the rear head 46 carries as an integral part thereof, the bracket 224, reinforced by the brace 225. The forward part 226 of the inner surface 229, and the forward part 227, of the upper edge 228, of the bracket, are beveled, as shown in Fig. 32. The standards 73 of the movable structure, carry the integral lug 230 and the pad 231, which are shown in engagement with the bracket 224 of the stationary structure. The under surface 232 of the lug 230, and the face of the pad 231 are accurately machined, as are also, the surfaces 228 and 229 of the bracket 224. Now, as the construction just mentioned, exists on both sides of the movable structure, indicated in Fig. 33, it will be evident that when the movable structure is replaced in the container, any slight inaccuracy in alignment of the parts as they near each other, will be readily counteracted by the tapered portions 226 and 227 of the bracket, and the movable structure be brought to its final resting-place in the desired accurate alignment with the stationary structure.

Inlet mechanism.

The inlet mechanism comprises, principally, a can reserve chute, regulating jaws, a can grouping pocket portion, a steam lock having an outside gate and an inside gate, a valve system, and an operating mechanism through which certain motions are imparted to the lock gates and other moving parts, in harmony with previously determined operating cycles.

By referring to the constitution diagram (Fig. 34) it will be seen that certain parts of the inlet mechanism are identical with certain parts of the outlet mechanism, and it will become evident that a detailed description of the inlet will serve largely as a description of the outlet mechanism also. But while certain of the mechanical elements in both mechanisms are practically identical, yet it will be perceived, when the description of the outlet mechanism is reached, that the arrangement and functioning of these elements, in the outlet mechanism, is generally in the reverse order and manner from that existing in the inlet mechanism.

Remembering that in the present embodiment of this invention, a twin unit is represented, it will be clear that two separate inlet devices are necessary, because the machine is provided with two cooking zones which are, in themselves, each a complete functioning sub-unit. The inlet sub-units are located at the two opposite upper corners of the double runway system, in right and left relation to each other, to harmonize with the right and left relations of the two conveyor runways.

Each inlet sub-unit (Figs. 1, 2, 3, 4, 6, 7, 8, 9, 14, 15, 16, 17, 18, and 19) has its own individual regulating jaws 233, outer inlet gate 234, inner inlet gate 235, gate chest 236 with its valves, and the like, while the peculiar motions required for these parts, are received from a common source, namely, the cam shaft 350, and cam wheel 289.

The steam lock with its immediate actuating parts, are most important in the inlet mechanism, and will be described first.

*Steam lock and actuating parts.*—The lock is located within the gate chest 236 which is supported upon a secondary neck portion 237 integral with the main neck 74 of head 47. The chest is separate from neck 237 for convenience in manufacture, but is connected thereto by flanges 238 and 239, secured to each other by bolts 240, with a steam-tight joint between. Another outwardly extending flange 241, with a steam-tight cover 242, gives access to the inside of the chest. The chambered space 243 within the gate chest, is in free communication with the steam space 50 of the cooking chamber. The outer gate 234 and the inner gate 235, together, are arranged to form the locking chamber for the steam, or briefly, a "steam lock." The space 50, being normally filled with steam under pressure, is normally closed to communication with the outside atmosphere, by always having either the gate 234, or the gate 235, firmly seated, steam-tight. These gates are mounted to have alternate oscillating motions in reversed relationship to each other, and are controlled by cams. The actions of the two gates are such, that before gate 234 begins opening, gate 235 will be closed against seat 245, and before gate 235 begins opening, gate 234 will in its turn, be closed against seat 244. Both seats 244 and 245 are preferably made of resilient material, snugly held in dovetailed grooves in the wall 246 of chest 236, and the gate-edges 223 imbed themselves in the seats when the gates are closed. The gates have each an arm 247 on which they are pivoted at 248, the respective arms having their other ends pivoted at 258 and 259, to parts of the chest structure. Adjustment is necessary for each gate relatively to its supporting arm, in order that it be aligned with its seat, and besides, allow a small amount of free motion between the gate and its arm, so that, in the final seating of the gate, it may align itself precisely with its seat, and bear down equally upon it at all points. For this purpose, the gates 234 and 235, and the supporting arms 247, are provided with the centrally disposed screws 249 and the flanking studs 250 (Figs. 6, 8 and 14). The screws 249 are threaded in the bosses 252 of arms 247, and locked by the nuts 251. The studs 250 are secured by threading in the bosses 253 of the gates 234 and 235, and carry at their opposite ends, adjusting nuts 254 and lock nuts 255. By properly manipulating the screws 249 and the nuts 254, any degree of adjustment and play desired between the gates and their supporting arms can be obtained. A certain amount of such play between a gate and its arm, is shown at 256 in Figs. 6 and 8.

The gate 234 having its oscillation about the hinge pivot 258, is arranged to receive motion from the rocker pin 260, which may be journaled in the movable boxes 261. The boxes 261 are supported in the yokes 262 and are adjustable in the jaws 263 of the latter. The yokes 262 are rigidly mounted on the body of the chest 236, and may be fastened by cap screws 266. The ends of the yokes are connected to each other by the distance piece 267, which is fastened thereto by the cap screws 265, these being threaded in the ends of the jaws 263. The adjustment of the boxes 261 is effected by means of the screws 268 which may be locked by the nuts 269. The rocker pin 260 may carry the rigidly mounted arms 270 and 271, the former being pivoted at 272, to one end of the connecting rod 273. The arm 271, at its outer end 274, may be pivoted to the link 275, the link in turn being pivoted at 276 to the lug 277 of the gate 234.

The gate 235 has its oscillation about the hinge pivot 259 and receives motion from the rocker pin 278, which is journaled in the bosses 279, forming integral parts of the walls of chest 236. The rocker pin 278 projects through the bosses 279, the latter being counterbored to form stuffing-boxes to receive packing and the glands 280, thereby making steam-tight joints. The rocker pin 278 carries the rigidly mounted arms 281 and 282, the former being pivoted at 283, to one end of the connecting rod 284. The arm 282, at its outer end is connected by the pin 285 to the link 286, the link in turn, at its other end, being pivoted by pin 287 to the lug 288 of the gate 235. The details just described, of the gates 234 and 235, as well as the related parts to be described, immediately following, are shown in Figs. 1, 2, 3, and 6.

The connecting rods 273 and 284, through the medium of the parts about to be described, are actuated by the cam wheel 289, which is fixed on the rotatable cam shaft 350. In the cam wheel 289 is formed the cam groove 295, the bounding surfaces of which engage the rollers 294, these latter being rotatably mounted on the ends of the arms 290 and 291. The arm 290 is rigidly mounted on a rocker shaft 296, on which shaft are also rigidly mounted the arms 292, while the arm 291 is rigidly mounted on the rocker shaft 297 on which are also rigidly mounted the arms 293. The arms 292 and 293 carry the adjustable extensions 298, these being slotted to receive the bolts 299, by means of which the extensions may be tightly secured in adjusted positions against their respective arms. The extensions 298 carry the pivot pins 300, and through these, the motion from the cam wheel is finally transmitted to the connecting rods 273 and 284. Forks 301, in the shanks 302 of which, are threaded the connecting rods 273 and 284, may be adjustably locked on the connecting rods by means of the nuts 303. The forks in their adjusted and locked positions may be regarded as integral parts of the respective rods to which they are attached. Obviously, this arrangement of the forks 301 permits adjustments to be made in the distances between the centers of the pivots connected by the respective rods.

Taking into consideration the relative motions of the two gates in forming the steam lock, two series of overlapping motion cycles may be plotted, as indicated in Fig. 9, one series for the gate 234, and the other, for the gate 235. These two series overlap each other to the extent of one-half of each motion cycle, so that each gate, alternately, will begin a new motion cycle at the mid-point of the motion cycle of the other gate. In each motion cycle of each gate, there will be two short intervals of time when both gates will be tightly closed, each closing of the gates completing the formation of the sealed chamber or lock. During one of these intervals, the lock will be full of steam under a pressure equal to that in the container 50. Under this condition, supposing that the gate 234 is to be opened, it is desirable for the steam in the lock to be first exhausted, and led to some remote point of discharge, before such opening takes place, for, otherwise, the steam from the lock would escape directly into the workroom where the machine is located. Usually, this would be decidedly objectionable.

During the second interval of time, the lock confines atmospheric air at the ordinary pressure, while the full steam pressure in the chest space 243 bears upon the surface of the inner gate 235. To easily open gate 235 under this condition, it becomes necessary to first fill the space within the lock, with steam from the chest space 243, for the purpose of equalizing the pressures on both sides of the gate 235.

*Valve system.*—The movements of the valves are subservient to those of the gates, and are indicated diagrammatically in Fig. 9. The exhausting of the steam from the lock, during the first interval mentioned above, is accomplished through a port 304 (Figs. 19, 17, and 6), leading from the lock space 446 to the valve chamber 305, the outlet from the latter being controlled by a valve 306. This outlet opens into a passage 307, which in turn may communicate with the atmosphere at some remote point (not shown), by means of a pipe 308.

Admitting steam under pressure, into the lock during the second interval, is accomplished through a port 309 (Figs. 18, 17, and 6) leading from the chest space 243 to the valve chamber 310, the outlet from which, is controlled by a valve 311. The outlet from the valve chamber 310 opens into the port 312 which communicates with the space 446 of the lock chamber.

The valve 306 has the stem 313, which is slidably mounted in the bearing 314, while the valve 311 has the stem 315, slidably mounted in the bearing 316. Each valve stem has a gland 317 threaded in a stuffing-box and packed to make a steam-tight joint around the stem. Compression spring 318 mounted on guides 319, which form integral extensions of the heads 320, are arranged to bear against the valves 306 and 311, to normally keep them seated. The heads 320 are shouldered to fit into the bored portions 321 and 322, for keeping the springs 318 centered. Steam-tight joints are formed by the use of gaskets 323, and the heads 320 are securely seated on these gaskets by means of the crabs 324, which may be tightened by the bolts 325. The valves 306 and 311 are actuated by the double arm tappet 326 (Figs. 18, 17, and 7) which is fixed on the stub shaft 327, the latter being rotatably mounted in the bearings 328 forming integral parts of the valve casing 329. The shaft 327 also carries the fixed arm 330, to the outer end of which is pivoted, by means of the pin 331, one end of the adjustable connecting rod 332. The other end of the connecting rod 332 is pivoted at 333 to the adjustable extension 335 of arm 334. The arm 334 is fixed on the rocker shaft 336, which is journaled in the bearing 337 of the horizontal hanger 338, and in the bearings 339 and 340 of the multiple hangers 341 and 342, respectively. The multiple hangers 341 and 342 have the feet 343 and 344, respectively, which may be rigidly attached to the cover plate 345, of the front head 47. The rocker shaft 336 carries also, the fixed arm 346, at the outer end of which is journaled the roller 347. The roller 347 is arranged for engagement by the cam surfaces 348 and 349, forming the groove on the near side of the cam wheel 289 (Fig. 6).

*Gate and valve operating mechanism.*—This has been partly described in connection with the steam lock and valve system. In the cam wheel 289, before mentioned, the cams 546 and 447, being the bounding surfaces of groove 295, are located on the opposite side (the far side in Fig. 6) from the cams 348 and 349, and therefore are shown in dotted lines. All the cams constitute integral parts of the same wheel and move together. The two rollers 294 on arms 290 and 291, occupy positions in the groove 295 diametrically opposite each other, causing the movements of the two gates to be 180 degrees apart, and their cycles of operation to overlap one half, for the reason that each gate cycle represents one complete revolution of the cam wheel. At the same time, the roller 347, on arm 346, occupies a position in cam groove 448, where the valves will be given their actuations in the proper relations to each other, and to the motions of the lock gates, in accordance with the diagram in Fig. 9.

Small final adjustments in the positions of the lock gates may be made by altering the lengths of the connecting rods 273 and 284; and in the positions of the valve stem tappets 326 (Fig. 17) by altering the lengths of connecting rods 332.

Small final adjustments in the magnitudes of the motions of the lock gates and the valve stem tappets may be made by altering the lengths of the actuating arms having, respectively, the extensions 298 and 335 (Fig. 6).

The cam shaft 350 carries also the rigidly mounted sprocket wheel 351, the latter being arranged to receive motion from the sprocket wheel 352 (Figs. 2 and 3). The wheel 352 is rigidly mounted on the shaft 71, which forms part of the conveyor system, and of course, receives its motion from the conveyor chains 52.

The cam shaft 350 is journaled in the bearing 353 of the hanger 338, and in the bearings 355 and 356 of the multiple hangers 341 and 342 respectively, (Figs. 1, 2 and 3). Portions of hanger 338 are broken away to show the cam grooves in wheel 289, more clearly. Rocker shafts 296 and 297 are also supported by the multiple hangers, in bearings 357 and 358, respectively, of hangers 341, and in bearings 361 and 362, respectively, of hanger 342.

*Reserve chute.*—The reserve chute, a portion of which is shown at 365 (Figs. 1, 4, and 6) is virtually the first part of the present machine which is encountered by the file of cans coming from the capping machines. The reserve chute extends a short distance above the regulating jaws 233 so as to hold a reasonable number of cans in immediate reserve. The cans are supplied to the reserve chute at its upper part (not shown) from any suitable source, by means of an elevator or hopper (not shown) and, in the present instance, continue their travel through the reserve chute by the force of gravity.

*Regulating jaws.*—The regulating jaws are located immediately below the reserve chute, and are used, in conjunction with the grouping pocket, for the purpose of regulating the maximum number of cans allowed to pass into the steam lock at one time. The jaws are opened by the closing movement of the lock gate 234 in the manner mentioned below, and are preferably arranged in pairs, 233—233 (Figs. 1, 2, 3, 4, and more in detail in Figs. 6 and 16). The two jaws are fixed on the small shafts 363, these being rotatably mounted in the lugs 364, which may form integral parts of the grouping pocket portion 449. Rigidly mounted on the shafts 363 are the arms 366, to each of which is pivoted one end of one of the links 367. Links 367, at their other ends 368, are pivoted to lugs which projects from either side of the upper end of the actuating or push bar 369, this being slidably mounted in the bearing 370, and the latter fixed to the pocket structure 449. At its lower extremity, the actuating bar 369 carries the roller 371, journaled on the pin 372, and arranged to be engaged by the cam lug 373. This lug is an integral part of the lip 374 of gate 234. The jaws 233 are connected to each other by the tension springs 375, the springs being fastened to the jaws by pins 376. The forward parts of the jaws 233, are arranged, when closed, to project through openings 377, into the passageway of the pocket 449, forming obstructions therein, and intercepting the travel of the file of cans 170.

In Fig. 6, the gate 234 is shown in the closed position. Its opening movement carries it in the direction of the arrow 378, and in so moving, the cam 373 allows the roller 371, and hence the actuating bar 369 with its attached parts, to descend, owing to the tension of the springs 375, which act on the jaws 233, and in due course, on the roller 371 also, thereby forcibly keeping the latter in close contact with the surface of the cam 373. This continues to the limit of the closing travel of the jaws 233, which finally bear against the lower edges of the openings 377. The closed position of the jaws 233, and the wide open position of the gate 234, are shown in Fig. 1.

*Grouping pocket.*—The grouping pocket portion 449 (Fig. 6), may be a continuation of the reserve chute 365, and its office is to limit the number of cans, in this instance, four, which may be detached from the entering file, as a group, to fill the steam lock to capacity at one time. The grouping pocket has no operating parts, it being merely a confined space for determining limits.

*Feeding mechanism.*

The feeding mechanism, in the present embodiment, comprises principally the magazine chute 383, the star-shaped spacing or segregating wheel 384, or simply "star wheel"; the can projecting wheel 392, or briefly "can projector"; a mechanism for giving a peculiar intermittent action to the motion of the star wheel; and means for driving the can projector as well as for imparting motion to the star wheel.

The operating parts of the feeding mechanism are located within and to one side of the secondary neck 237 and the twin neck 382 joined thereto, these two neck portions being integral with the main neck 74 of the front head 47. This is shown generally in Figs. 1, 2, 3, 4, and 6, and more in detail in Figs. 10, 11, 12, and 16.

The magazine chute 383 is composed of two halves "h" and "k" (Fig. 16) whose lower ends are shaped into the elbows 385 and 386 (Fig. 6) for connecting the various members of the transfer limb structure 200—201 to various members of the conveyor entry fold 110, as shown in Figs. 4, 6, and 16. The magazine chute further, is fastened to wall portions of the neck 237 and to the wall of chest 236 by screws 387, and also by screws 388. The bottom of the magazine chute 383, at its lower end, has the opening 389 which is arranged to admit the star wheel 384. Star wheel 384 is fixed on the shaft 390, which is journaled in the walls of neck 382 in which are formed also stuffing-boxes for receiving the glands 391 to form steam-tight joints.

The can projector 392 is located above and slightly to one side of the star wheel 384, in proximity to the end of the top portion of magazine chute 383. The projecting wheel 392 is fixed on the shaft 393, and the latter is journaled in the bearings 394 forming part of the frame 395, which is oscillatingly journaled about the axis of the shaft 396. A continuous rotary motion is imparted to the projecting wheel by means of the gear 397 rigidly mounted on the shaft 393 and meshing with the gear wheel 398, which latter is secured on the shaft 396. Shaft 396 is journaled in the bearings 399 formed in the walls of the neck 237, wherein are also formed stuffing-boxes arranged for packing, which is secured by the glands 400 for making steam-tight joints around the shaft 396.

In order to hold the projecting wheel 392 adjustably in definite positions under spring pressure, the frame 395 is provided with the arm 401 which is engaged by the adjustable limit rod 402, and the tension adjusting screws 403. The rod 402 has the head 404, which forms a lower limit stop for the arm 401, and as the rod is slidable in the lug 405, it may be positioned as desired, and securely held by means of the set screw 406 which is threaded in the lug 405, as shown in Figs. 6 and 14. The screws 403 flank the rod 402 on either side, and are also threaded in the lug 405, being locked therein by the nuts 407. The screws 403 have their lower ends turned down to fit into the open-end capsules 408, these being inserted in the upper part of compression springs 409 which furnish the spring pressure above referred to. The lower ends of the springs 409 fit over the bosses 410, these being made integral parts of the arm 401. While the hole in the end of the arm 401, through which the rod 402 passes, describes an arc about the center of the shaft 396, when the oscillating frame 395 is moved, yet the amount of motion is slight, and the hole may have considerable clearance, so that there shall be no binding between the arm 401 and the rod 402, when the frame 395 oscillates. The projecting wheel 392 has the diametrically enlarged portions 411, on which are sprung the friction rings 412, which may be made of rubber or other material having a high coefficient of friction. The rings 412 may be two in number, and be spaced longitudinally along the projecting wheel 392, in such positions that the rings will contact the cans at suitable points of their circumferences.

The purpose of the star wheel is to separate the individual cans one by one, from the group of cans held in the magazine chute 383, and to allow the succeeding cans of the group to gravitate gradually through the chute. This is clearly shown in Fig. 6, where the lowermost can 170—1 of the group of four shown in the chute 383, is contacting the vane 413 of the star wheel, which latter, rotating in the direction of the arrow, is about ready to let this can 170—1 slip into the pocket 414 of the star wheel. By the time the can 170—1 has fully entered the pocket 414, the vane 415 of the star wheel, will have entered the triangular space 416 (this space being maintained as the cans move downwardly) between the cans 170—1 and 170—2, at the same moment the center of the can will lie about in a straight line joining the centers of the star wheel 384 and the can projecting wheel 392, so that the friction rings 412 of the projecting wheel 392, will be firmly pressed upon the circumferential surface of the can. Under pressure from the springs 409, the constantly rotating projecting wheel 392 in frictional contact with the surface of the can, will cause the can to bear against the vane 413 to the fullest extent possible, and as the star wheel continues to rotate, the can 170—1 will be urged forward until it begins to emerge from the pocket 414 in exactly the same manner as the can 170—5 is in the act of doing in the momentary position indicated in Fig. 6. It will be observed that the can 170—5 has reached a point where it is bearing against the impeller tube 107—5 immediately in front of it, because the peripheral speed of the projecting wheel is greater than the linear speed of the impeller. Therefore, as the conveyor chains move, the can 170—5 continues in close contact with the impeller 107—5, until it finally rolls into the gap between impellers 107—5 and 107—1, and is carried along by impeller 107—1 into the entry fold 110 of the conveyor system, just as have been, the cans 170, preceding.

In a similar manner, the cans 170—1, 170—2, and so on, will be placed or loaded into the respective gaps between impellers 107—1 and 107—2, 107—2 and 107—3, and so on. Each successive can can thus enters its apportioned consecutive gap between the traveling impellers. The impellers following the pitch circle of sprocket wheels 61, pass upwardly between the tips of the star wheel vanes and the lip 417 of the elbow portion 385 through the space between the elbow portions 385 and 386, and into the entry fold 110 of the conveyor system. The peculiar intermittent motion necessary for the star wheel will now be described in detail.

In the position of the star wheel as represented in Fig. 6, it is important that the star wheel remain stationary in that position until the projecting wheel 292 will have forced the can 170—5 forwardly into the conveyor gap, and the can shall have passed clear of the circumferential path of the vane tips of the star wheel, so as not to offer any danger of mutilating the cans by jamming them between any moving parts. Therefore, it becomes necessary to hold the star wheel stationary during that certain interval of time required to bring the conveyor from the position where one gap registers exactly with the entering position of one can, to the position where the next gap registers with the entering position of the next can. This is accomplished in the present instance, by allowing the star wheel shaft 390 (Figs. 11 and 14) to project outwardly, beyond the gland 391, a sufficient distance so that a grooved pulley 419 may be fixed on the shaft 390, and adjacent this pulley, be fixed a ratchet wheel 420 having in this instance, five teeth, shown in Fig. 10. Engaging the teeth of the ratchet wheel 420 is a dog or latch 421, which is rigidly connected, though with allowance for a slight degree of adjustment, to a second dog or latch 424, and to a tail member 425. Integral with each of the latches 421 and 424, and with the tail member 425, are disk portions 426, 427, and 428, respectively, all closely adjacent each other. These disk portions have slots 429 which are arranged to register with each other, and through which are passed the bolts 430 for clamping all three disks tightly together, causing the three parts to act as one piece. This aggregation is journaled on the shaft 42, which is supported in the standards 423 forming parts of bracket 166, and rigidly held therein by the set screw 431. The slotted portions 429, mentioned above, allow limited adjustments to be made in the positions of the latches 421 and 424, relatively to each other, in order that the positions of the engaging portions of those two latches may be equalized between the teeth of the ratchet wheel 420 and of the cam wheel 433, respectively.

The latch 424 is in reality nothing more than an operating lever for the latch 421, and is actuated by the cam teeth 432 of the wheel 433. This cam wheel, together with the sprocket wheel 440 is fixed on the hub 439, which is rigidly mounted on the shaft 71, and rotates in the direction of the arrow (Fig. 10).

The latches 421 and 424 are held against the respective wheels which they engage, by a yielding pressure proceeding from the compression spring 434 strung on the bolt 435, the latter having its end threaded in the boss 436 forming part of the bracket 166. The lug 437 of tail member 425, has the slot 438 through which the bolt 435 passes, making it possible to adjustably stress the spring 434 on top of the lug 437.

Starting from the positions of the parts shown in Fig. 10, the cam wheel 433 in rotating, will cause its tooth 432 to push the latch 424 in the direction of the arrow 441, just enough to disengage the latch 421 from the tooth 450 of the ratchet wheel 420, thereby releasing momentarily the shaft 390 from any restraint to rotation, that instant however, due to the constant running a rotative urge of belt 526, being sufficient to allow the tooth 450, to slip away from the hook 442. The quick action of the spring 434 tends to return both latches to their former positions, thus causing the hook 442 to strike the back part of the tooth 450, and to ride the same until hook 442 comes into engagement with the front part of the next tooth 451, where tooth 451 will be stopped abruptly. This operation positions the star wheel precisely at the point desired, and positively holds the star wheel in that position until the latch 421 is again caused to release a tooth of the ratchet wheel. Each time a tooth of the cam wheel 433 passes the point 452 of the latch 424, the operation just described will be repeated, and the ratchet wheel 420, will be allowed to move forward to the extent of the space occupied by one of its own teeth.

The belt 526 is preferably round in cross-section, and receives its motion from the small grooved pulley 445, transmitting this motion to the larger grooved pulley 419, thus giving rotation to the ratchet wheel 420 and the star wheel 384. The small grooved pulley 445 is fixed on the shaft 396, on which is also secured the sprocket pinion 444, driven by the chain 443, the latter receiving its motion from the larger sprocket wheel 440, previously mentioned.

Motion can take place in the pulley 419 only at such times as the latch 421 is disengaged, and then only to the extent of the length of one tooth. Normally, the shaft 396 is constantly rotating, so that the belt 526 must slip or slide, normally, on either the driving pulley 445, or the driven pulley 419. The slipping will of course, be on that pulley offering the least resistance, but, which one, is immaterial to the present purpose.

The speed ratio of the driving sprocket wheel 440 to the driven pinion 444, should be sufficiently great, so that the relatively slow speed of the shaft 71, shall still cause the can projecting wheel 392, and the star wheel 384, to rotate at comparatively rapid rates, first, to give the cans the necessary impetus to project them from the tips of the star wheel vanes into the conveyor gaps; and second, that when the star wheel moves from position to position, it shall do so with a quick flip, as the interval of time allowed for the movement, is slight.

Now, to make clear the numerical relationship between the movement of the conveyor chain and the motion of the intermittent drive for the star wheel: Keeping in mind the function of the star wheel, it will be seen that every time an impeller passes it, the star wheel should move through an angular space corresponding to one of its pockets (in this instance, one-fifth of 360 degrees), in order that a can may be brought forward for projection into a conveyor gap. As there are five pockets in the star wheel, its motion must be arrested five times during one revolution thereof, for which reason the controlling ratchet wheel must have five teeth. Inasmuch as the sprocket wheels 61 receive their motion from the conveyor chains 52, and as the star wheel 384 derives its motion indirectly from the shaft 71, upon which the sprocket wheels 61 are fixed, it follows that this numerical relation is easily established. The pitch of the sprocket wheels 61 is equal to the pitch of the conveyor chains 52, and as each conveyor gap accompanies two links, or pitches, one complete revolution of the sprocket wheels 61, each having eight teeth, will move the conveyor through a length equal to four times the center to center distance of two consecutive links. Therefore, each complete revolution of the sprocket wheels 61, requires that the star wheel be moved through four-fifths of a complete revolution. Referring to Fig. 10, it will be seen that this ratio between the movement of the shaft 71 and the shaft 390, is maintained at all times.

Other ratios could be used, so long as the number of can pockets of the star wheel passing a point in a certain time, is equal to the number of gaps of the conveyor passing a point in the same time.

The feeding mechanism, as above described, serves the cooking zone "A," and the only difference between it and the opposite-hand feeding mechanism, serving cooking zone "B," (Figs. 4 and 2) is that in mechanism "A," the sprocket wheel 352, mounted on the extended conveyor shaft 71, transmits motion through the sprocket chain 454, to the sprocket wheel 351, secured to the cam shaft 350, from which are operated both inlet mechanism sub-units, while in the unit "B," the sprocket wheel 455, mounted on the other extension of conveyor shaft 71, is used to drive the cam shaft 456 through the medium of the sprocket chain 457 and sprocket wheel 458, the latter fixed on the cam shaft 456, this forming the drive for the outlet mechanism.

*Outlet mechanism.*

The outlet mechanism comprises a receiving throat portion, a steam lock with inside and outside gates, a valve system, an operating mechanism, and a discharge tube.

The receiving throat 501 (Figs. 1 and 4) fills the same requirement for the outlet lock that the grouping pocket 449 (Fig. 6) does for the inlet lock, namely, that of providing a space for holding in immediate readiness, for entrance into the lock, a charge of cans equal to the full capacity of the lock. The difference between the grouping pocket and the receiving throat is, that in the former, the full number of cans is allowed by the regulating jaws to descend into the grouping pocket in a body, while in the latter case, the cans are assembled and accumulated, one by one, as they are expelled from the exit fold of the conveyor runway.

The motion of the outlet lock is timed to the motion of the inlet lock, as plotted in the diagram in Fig. 9, so that the number of cans entering the receiving throat, can never accumulate to a greater extent than its capacity warrants. The action of the inlet lock virtually controls, though indirectly, the passage of the cans into the receiving throat at the outlet mechanism, for the reason that the operation of the inlet and outlet locks are in step with each other, thus affording exactly the same outlet capacity, as there is inlet capacity.

The outlet lock with its operating mechanism and its valve system, are similar in construction to the corresponding parts in the inlet mechanism, but for convenience, in the present embodiment of the machine, the outlet lock is made of substantially double the width of the inlet lock, instead of being made into two separate sub-units, as is the case with the inlet locks.

This double width outlet lock is housed in the gate chest 493, and is made up of the inside gate 494 and the outside gate 495. These two gates are pivotally mounted on the arms 459 in a manner similar to the mounting of the gates 234 and 235 on arms 247, the details of mounting and adjusting being alike in both cases. Inside gate 494 is operated from the rocker pin 460, through the arms 461 and the link 462. The rocker pin 460 receives its motion through the arm 463, connecting rod 464 and arm 465, rocker shaft 466, and the arm 467, actuated by the cam wheel 468 which engages the roller 469 on the end of arm 467 in exactly the same manner as has been described for the corresponding inlet gate. The gate 495 receives its motion from the rocker pin 470 which is carried in the adjustable boxes 471, these being held in the yokes 472. Arms 473 and link 474 extend from the rocker pin 470 to the gate 495. Arm 475 extends from the rocker pin 470 to the connecting rod 476, the latter being pivoted to the arm 477 extending from the rocker shaft 478. This rocker shaft is actuated by the arm 479 carrying the roller 480, which engages the same cams (not shown) of the wheel 468, as does the roller 469.

The valve system is like that illustrated and described for the inlet mechanism, and is actuated by the tappet 481, mounted on the shaft 482. This shaft is rocked by the arm 483, the latter being pivoted to the connecting rod 484 which extends to the arm 485, mounted on rocker shaft 486, and actuated by the arm 487. This arm carries the roller 488, which engages cams (not shown) on the wheel 468, these being similar to the cams on the wheel 295 for operating the inlet gate valves.

The cam wheel 468 is fixed on the cam shaft 456, the latter being driven as previously described. The cam shaft 456 is journaled in a bearing carried by the bracket 489, and another bearing in the nearest multiple hanger 341 (Fig. 3). The valve actuating rocker shaft 486 is carried in a bearing 490 on the bracket 489, and also in bearings 491 of multiple hangers 341, and in the bearing 492 of multiple hanger 342.

The gate chest 493 is supported in a depending position, from the neck 496 which forms an integral part of the lower end of the front head 47. The chest and the neck are joined to each other, steam-tight, by means of the flanges 497 and 498, secured by the bolts 499. The gate chest is further provided with the removable steam-tight cover 500. The receiving throats 501 are in duplicate, and are secured to the inside of the neck 496, and to the neck portion 502 of the gate chest 493. The receiving throats have the elbow portions 503 and 504, by which the guides of the exit folds 141 forming parts of the conveyor system, are connected to members of the transfer limbs.

The discharge tube 505 has duplicate passages therethrough, and may be in the form of an elbow, as shown in Fig. 1, so the cams may be discharged into a trough 506 into which are fitted the pipes 507. Streams of water spurt from pipes 507 to convey the cans to a suitable point for the next operation, which is that of labeling. The contents of the cans are cooled in transit, thereby relieving the steam pressure on the inside of the cans.

The conveying and cooling trough with its appurtenances, of course, form no part of the present invention.

Operation.

For the purpose of giving a connected survey of the operation of this invention, the transit of a group of cans from the time it comes to the machine, until the cans of the group leave the machine, will now be followed.

Supposing a file of cans, (Fig. 6), to be coming down by gravity from a source of supply, through the reserve chute 365, in a continuous procession, the regulating jaws 233 being open, as shown, and the outer lock gate 234 being closed.

The lowermost can of the procession will strike and come to rest against the outside of the lip or bar 374 of outer gate 234; then supposing the cam wheel 289 to be rotating in the direction of the arrow, the roller 294 on arm 291, will presently leave the neutral portion 546—3 of the cam wheel and will then be raised by the cam portion 546, thereby depressing the arm 293, and pulling on the connecting rod 284, seating the gate 235, the latter unavoidably confining in the lock, steam under the regular working pressure. Immediately after the gate 235 has been fully seated, the roller 347 will be lifted by the cam portion 349, causing a pull on the connecting rod 332. This depresses the arm 330 (Figs. 7 and 17) and consequently forces the lower arm of tappet 326 inwardly, against the valve stem 313, thus opening the valve 306 to the position indicated by dotted lines in Fig. 19. The opening of valve 306 allows the steam from lock space 446 to be exhausted, as indicated by the arrows, and to be conducted away by the pipe 308. The valve 306 remains open until the roller 347 (Fig. 6) is passed by the neutral part 349—1 of the cam wheel, being again closed when the roller 347 is depressed by the cam portion 348—2. The term "neutral" as here used, signifies that the grooved portions are concentric with the cam wheel, and hence transmit no motion. The roller 347 is next passed over by the neutral part 349—3 of the cam wheel, during which time the valve 306 remains closed. Meanwhile, the neutral portion 447—1 of the cam wheel, will have been traversed by roller 294 on arm 290, and the roller 294 will have reached the cam 447—2. From this point, the further rotation of the cam wheel, will draw arm 290 inwardly, towards the shaft 350, causing arm 290 to be lifted by cam 447—2, until its roller 294 passes into the neutral part 447—3. The lifting of the arm 290, causes a pull on the connecting rod 273, and through the various succeeding arms and links, opens the outer lock gate 234. During the opening movement of this gate, the roller 371 will descend along the upper surface of the cam 373, allowing the actuating bar 369 to move downwardly, which tends to close the jaws 233, this action being resisted only by the bearing of the roller 371 on the surface of the cam 373. The closing of the jaws intercepts the progress of the cans down the chute, and coming in contact with the lowermost can 170—10, the jaws support this one and the procession of cans behind it.

Immediately after the jaws 233 have been closed the gate 234 will be ready to slip out from under the can 170—6 (Fig. 6), and the further movement of the gate 234 brings this about, allowing the four cans 170—6 to 170—9 to drop into the lock. Remembering that the gate 235 has meanwhile closed, it will be seen that the falling cans will be caught on the inside of the lip or bar 515, and be retained there in the position shown in Fig. 1. To thus retain the cans, it is necessary to provide the lock chute portion 508, which latter is secured to the wall 246 as shown in Fig. 6. When the group of cans falls into position in the inlet lock, as just described, the neutral portion 447—3 of the cam wheel, will be passing over the roller 294, on arm 290. As soon as this neutral portion has passed over the roller, and the latter is engaged by the cam 546, the arm 290 begins descending from the position indicated in Fig. 1. This action again closes gate 234, and in so doing, the cam lug 373 passes under the roller 371, lifting the same, and pushing the jaws 233 outwardly, allowing the can 170—10 (Fig. 1) together with the cans back of it, to descend through a space equal to that occupied by a group of four cans. This brings the can 170—10 against the outer face of the lip or bar 374 of the gate 234, in the same position as is shown occupied by the can 170—6 (Fig. 6). Immediately after the gate 234 has again become seated, the cam 348—4 comes into engagement with the roller 347 depressing the same, and forcing the arm 346 to move downwardly, thereby lifting the connecting rod 332, and in consequence the arm 330 also, thus causing the upper arm of tappet 326 to press on the valve stem 315, opening the valve 311, and allowing steam from the chest space 243 to flow into the lock space 446, as indicated by the arrows in Fig. 18. This equalizes the steam pressure on each side of the gate 235, and as the cam wheel 289 continues its rotation, the roller 347 will pass through the neutral portion 348—5, while the valve 311 remains open, after which the latter is again made to close, by the roller 347 engaging the cam portion 348—6. Meanwhile, the cam wheel 289 will have rotated to the position where the roller 294 of arm 291 is ready to be engaged by the cam 447—2, and to be depressed from the position shown in Fig. 1, to the position shown in Fig. 6, thus opening the gate 235, and allowing the group of cans 170—6 to 170—9 to gravitate from the lock space as shown in Fig. 1, down into the position occupied by the preceding group of cans 170—1 to 170—4, against the star wheel 384, as shown in Fig. 6. From this position, the group of four cans is fed one by one, into the conveyor system in the manner described in connection with the star wheel under the heading "Feeding mechanism".

The instanced group of four cans has now passed into the entry limb 110 of the conveying system (Fig. 26) and will be carried consecutively through the folds 110 to 117 of section "a", passing upwardly through transfer limb 142 into fold 118 of section "b", through the various folds of section "b" and into the transfer limb 143, and so on, until this group of cans is finally expelled, one by one, from the conveyor system at the point 207 (Figs. 1 and 26).

After being expelled from the conveyor system, the cans roll by gravity, down the receiving throat 501 of the outlet mechanism, (Fig. 1), until they strike the surface of the lip or bar 516 of lock gate 494 when the latter is in closed position (not shown), the cans accumulating or assembling until four cans occupy the positions indicated by the dotted lines. As the gate 494 opens, the cans, acted upon by the force of gravity, roll downwardly into the position shown by the full lines within the gate 495, and so remain until the gate 494 is closed, the steam pressure exhausted from the resulting lock chamber, and the gate 495 opened, which allows the cans to descend by gravity, through the discharge tube 505, into the trough 506, where jets of water from pipes 507 cool the cans, and drive them forward to the proper point for the next operation, which is usually that of labeling, but with which the present invention is not concerned.

Recapitulation.

The features which characterize the outomatic operation of a machine embodying this invention, and the automatic passage of the cans therethrough, reside largely in the novel arrangement of the fluid-pressure lock mechanisms, and particularly so, in that of the gates making up the lock. The forms, dispositions, and motions of the gates and the parts associated with these, together with the method of operating, and the method of seating, these gates, are all unique, so far as we know.

In typifying the construction of the gates constituting a lock, the gates may be said to resemble in section, "the shape of two letters L set together in mutually opposed relation" or in other words, "the L's are in conjunction, in mutually inverted relation". That is to say, the extremity of the stem of each L is adjacent the extremity of the bar of the other L. This, in the closed or "locked" position, each gate having an L-shape.

Typically, a chute structure may be associated with such a lock, and a portion of the chute structure may be arranged for confinement within the lock. Further, the two gates may each be pivotally mounted, for oscillation substantially in the direction of the sectional plane, the axes of the two pivots being located, preferably, outside the chute structure and on opposite sides thereof, so that a right line joining the pivotal points in the section plane shall intersect the direction line of the chute.

Means are then arranged for holding, separated from each other, two fluids, each under a pressure different from the other. One of the gates opens into a space in which prevails one of the pressures, while the other gate opens into a space in which the other pressure prevails, and the chute structure leads from one of the spaces into the other space.

By the opening and closing motions alternately, of each gate, in similar, but mutually overlapping cycles, three principal conditions will prevail, occurring in a series of periods to form associated cycles, the associated cycles succeeding each other in indefinitely recurring order.

Each associated cycle has the principal periods specified following: namely, (1) where, at the same time, the outside gate is open and the inside gate is closed; (2) where, at the same time, both gates are closed; (3) where, at the same time, the outside gate is closed and the inside gate is open; (4) where both gates are closed at the same time. This is plain from the diagram in Fig. 9.

It is obvious that when a fluid-pressure lock construction, such as has just been outlined, is used with the atmosphere as one of the fluids under pressure, that one of the gates of a lock may open directly into the atmosphere, while the other gate must open into a space which is enclosed, to confine a fluid under the other pressure.

In Fig. 6, of the present specific embodiment of the invention, the L-shaped construction of the gates can readily be followed. The end of the stem portion of each of the L's is located immediately adjacent the end of the bar of the other gate when the gates are closed. The line joining the centers of oscillation of the two gates, passes through this section almost diagonally from stem point to bar point, and the seats for the gates are made substantially parallel to this line. The passageway for the cans, cuts through the wall structure supporting the seats, and thus intersects the planes of the seats, permitting the gates with their bars to be swung outwardly, away from each other, thereby clearing, or unbarring the passageway of the chute structure. By giving an alternating oscillating motion to the gates, the file of cans is allowed to pass into the lock and out again in a continuous train of individual groups, separated only by the intermittent time element of each group. The motion of the file of cans is therefore arrested once during each associated, or complete, motion cycle of the gates.

The reserve chute 365, the lock chute 508, and the magazine chute 383 (Figs. 1 and 6) may all be regarded as portions of one continuous can guide chute, the three chute portions being in alignment with each other. Also, the receiving throat 501, the lock chute 517, and the discharge tube 505 (Fig. 1) form portions of another chute. These chutes may be regarded, in the present embodiment, as being intersected by the seating plane or planes, as the case may be, of the lock gates, the centers of oscillation of the gates, being located on opposite sides to each other, of the chute, as above mentioned. When the gates come together to form the lock, they are separated from each other, only by the seat supporting portion, and when the gates bear tightly upon their seats, a perfectly sealed fluid-pressure chamber or compartment is formed, enclosing the lock chute portion. The quickly made, make-and-break contact between the gate and its seats, eliminates sliding friction and the attendant difficulties in making a tight seal.

The movements of the inlet mechanism, and consequently, also those of the outlet mechanism, are so arranged that each opening and closing of the respective gates is in exact timed relation to the motion of the traveling members of the conveyor. Stated specifically, each time the gates of the inlet mechanism pass through an associated cycle, four cans will be admitted to the cooking chamber, and each time the gates of the outlet mechanism pass through an associated cycle, which means that the conveyor must move at a speed allowing four gaps to pass a certain point each time that either gate mechanism allows four cans to pass through, four cans will be discharged from the cooking chamber.

In the construction of the runway of the conveyor system, the folds that are between the entry fold and exit fold may be called "interjacent" folds, and these folds being located one above another, as over folds and return folds in alternating relation in each of the different sections, the length of time that a can is in the cooking chamber, depends upon the combined lengths of the folds in each section multiplied by the number of sections connected to each other by the transfer limbs to form stacks. Thus, by properly proportioning and combining the lengths of the individual folds, the number of folds in a section, the number of sections in a stack, and the speed of the conveyor travel, the duration of the cooking period can be accurately predetermined.

The feature which particularly distinguishes the conveyor system of this machine from that of any other with which we are familiar, is the arrangement of the runway in sections, each made up of the plurality of folds superposed upon each other, and extending back and forth in alternating order, also, the transfer limbs joining the extreme fold of one section to the opposite extreme dissimilar fold of an adjacent section. This construction assumes a form where all the extreme folds, with the transfer limbs joining them, constitute a looping structure, which almost encloses the remaining folds.

In Fig. 1 this may be clearly seen, where decks "m" and "u" contain the "extreme" folds. Each complete fold section with the transfer limb, is orthographically projected in Fig. 1, and has the general outline of a rectangle, or broadly, a quadrilateral. The interjacent folds are orthographically projected in the representations of decks "n" to "t", and these extend re-entrantly of the quadrilateral. Taken collectively, the extreme folds with the transfer limbs of the entire machine have the general solid form of a parallelopiped or prism, with the interjacent decks of folds extending re-entrantly thereof, from the fourth lateral face of the body.

The looping feature, with re-entrant folds, makes possible the advantageous endless arrangement of the conveying chains as previously fully described.

The fact that a plurality of individual folds are ranked in decks, secures the lateral alignment of the individual folds with each other, (as in Fig. 25), and enables the conveying chains to serve, by means of the impellers carried, a considerable number of individual folds, simultaneously. Any convenient number of fold sections, from one, upward, may be employed, and any reasonable number, over one, may be ranked side by side, to constitute the decks. Great freedom in the arrangement of the folds is thus allowed.

No matter how many sections of folds are used in the conveying system, the cans may come to the machine in single file, and be isolated from the file one by one, in all cases, through the insinuation of the star wheel vanes one by one, into each space between cans.

The working capacity of the machine is determined by the number of cans passing the star wheel in a unit of time, and the working capacity is not affected by the length of the runway.

Cans may be fed to the machine, up to its maximum holding capacity, but it is not necessary to supply cans to the full capacity, as the component parts of the machine function in the prescribed manner, whether cans are passing through, or not.

Steam under any suitable pressure, usually about 15 pounds per square inch for canning peas, may be supplied through a pipe 520 (Fig. 1), from any suitable source, such as an ordinary steam boiler, (not shown). A thermometer and steam gauge, (not shown) may be attached to the container in any convenient place.

In order to draw off water of condensation from the container 40, a pipe 524, controlled by an ordinary valve (not shown) may be provided.

Although this machine is primarily intended for the particular purpose mentioned, yet it will be evident that it is possible to adapt it for other uses. Also, the pressure container might be utilized to exclude a pressure from the space within the container. This would amount to confining a negative pressure.

If the fluid inside the container were to be rarefied to a pressure less than that of the atmosphere, the action through the gates and valves would be reversed from that specified in the description herein contained. That is to say, the fluid-pressure locks instead of receiving the highest pressure from the inside of the container would receive it from the outside, and the present exhaust valves would be changed in their function to inlet valves leading from the atmosphere into the lock spaces, and the present live pressure valves would simply admit the fluid contents of the locks to the container. The container would necessarily be fitted with any well known device, such as an air pump (not shown) for constantly exhausting from the container, the fluid accumulating therein.

In Fig. 34, the arrows 570, 571 and 572 indicate the course of cans through the main subdivisions of the cooker, while the numerals inclosed in circles, indicate the order in which the various parts of the subdivisions are traversed by the cans.

While, for convenience, a specific embodiment of this invention is herein shown and described, it is to be clearly understood that the details may, or may not, be in the preferred forms thereof, and further, that the preferred details may be varied from time to time, depending upon the circumstances and conditions governing, and governed by, the development of the invention, and the arts to which it is incident. To the skilled inquirer, therefore, that which is an essential and characteristic part of this invention, will be readily discernible from the claims in which is embraced a broad generalization of its spirit.

Having fully described our invention, what we claim is:

1. A fluid-pressure container, a conveyor disposed internally thereof, an inlet mechanism for transferring objects from the outside to the inside of the container, a feeding mechanism arranged to receive objects from the inlet mechanism and to feed said objects to the conveyor, in timed relation to the travel of the conveyor, and a fluid-pressure outlet lock for receiving objects from the conveyor, said outlet lock formed of oscillating outlet gates operably arranged in mutually opposed relation, and means for operating the outlet gates in timed relation to the movements of the inlet gates.

2. A fluid-pressure container, a conveyor disposed internally thereof, an inlet mechanism for transferring objects from the outside to the inside of the container, a feeding mechanism arranged to receive objects from the inlet mechanism and to feed said objects to the conveyor, in timed relation to the travel of the conveyor, and oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

3. A fluid-pressure container, a conveyor disposed internally thereof, an inlet mechanism comprising mutually opposed oscillating gates operable to intermittently confine a space apart from the container space, means for projecting objects from the inlet mechanism to the conveyor, and an outlet mechanism, arranged to receive objects from the conveyor and to transfer said objects from the inside of the container, to the outside thereof.

4. A fluid-pressure container, a conveyor disposed internally thereof, an inlet mechanism for transferring objects from the outside to the inside of the container, a magazine for receiving objects in file from the inlet mechanism, means for segregating objects from the file, means for projecting said objects to the conveyor, and a fluid-pressure outlet lock for receiving objects from the conveyor, said outlet lock formed of oscillating outlet gates operably arranged in mutually opposed relation, and means for operating the outlet gates in timed relation to the movements of the inlet gates.

5. A fluid-pressure container, a conveyor disposed internally thereof, an inlet mechanism for transferring objects from the outside to the inside of the container, a magazine for receiving objects in file from the inlet mechanism, means for segregating objects from the file, means for projecting said objects to the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

6. A fluid-pressure container, a conveyor disposed internally thereof, an inlet mechanism comprising mutually opposed oscillating gates operable to intermittently confine a space apart from the container space, a rotatable segregating member having rest periods and motion periods, arranged to receive objects in file from the inlet mechanism, said periods being in timed relation to the travel of the conveyor, means for projecting objects from the segregating member to said conveyor, and an outlet mechanism arranged to receive objects from the conveyor and to transfer said objects from the inside of the container, to the outside thereof.

7. A fluid-pressure container, a conveyor disposed internally thereof, an inlet mechanism for transferring objects from the outside to the inside of the container, a rotatable segregating member having rest periods and motion periods, arranged to receive objects in file from the inlet mechanism, said periods being in timed relation to the travel of the conveyor, means for projecting objects from the segregating member to said conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

8. A fluid-pressure container, a conveyor disposed internally thereof, an inlet mechanism for transferring objects from the outside to the inside of the container, a rotatable segregating member having rest periods and motion periods, arranged to receive objects in file from the inlet mechanism, said periods being in timed relation to the travel of the conveyor, means for projecting objects from the segregating member to said conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

9. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a feeding mechanism arranged to receive objects from the inlet mechanism and to feed said objects to the conveyor, in timed relation to the travel of the conveyor, and an outlet mechanism, arranged to receive objects from the conveyor and to transfer said objects from the inside of the container, to the outside thereof.

10. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a feeding mechanism arranged to receive objects from the inlet mechanism and to feed said objects to the conveyor, in timed relation to the travel of the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

11. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a feeding mechanism arranged to receive objects from the inlet mechanism and to feed said objects to the conveyor, in timed relation to the travel of the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

12. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a magazine for receiving objects in file from the inlet mechanism, means for segregating objects from the file, means for projecting said objects to the conveyor, and an outlet mechanism, arranged to receive objects from the conveyor and to transfer said objects from the inside of the container to the outside thereof.

13. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a magazine for receiving objects in file from the inlet mechanism, means for segregating objects from the file, means for projecting said objects to the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

14. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a magazine for receiving objects in file from the inlet lock, means for segregating objects from the file, means for projecting said objects to the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

15. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, and an outlet mechanism, arranged to receive objects from the conveyor and to transfer said objects from the inside of the container to the outside thereof.

16. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

17. A fluid-pressure container, a conveyor disposed internally thereof, a fluid-pressure inlet lock formed of oscillating inlet gates operably disposed in mutually opposed relation, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

18. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a feeding mechanism arranged to receive objects from the inlet mechanism and to feed said objects to the conveyor, in timed relation to the travel of the conveyor, and an outlet mechanism, arranged to receive objects from the conveyor and to transfer said objects from the inside of the container to the outside thereof.

19. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a feeding mechanism arranged to receive objects from the inlet mechanism and to feed said objects to the conveyor, in timed relation to the travel of the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

20. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a feeding mechanism arranged to receive objects from the inlet mechanism and to feed said objects to the conveyor, in timed relation to the travel of the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

21. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a magazine for receiving objects in file from the inlet lock, means for segregating objects from the file, means for projecting said objects to the conveyor, and an outlet mechanism, arranged to receive objects from the conveyor and to transfer said objects from the inside of the container to the outside thereof.

22. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a magazine for receiving objects in file from the inlet mechanism, means for segragating objects from the file, means for projecting said objects to the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

23. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a magazine for receiving objects in file from the inlet lock, means for segregating objects from the file, means for projecting said objects to the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

24. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, and an outlet mechanism, arranged to receive objects from the conveyor and to transfer said objects from the inside of the container to the outside thereof.

25. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

26. A fluid-pressure container, a conveyor disposed internally thereof, oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

27. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway, an inlet mechanism comprising mutually opposed oscillating gates operable to intermittently confine a space apart from the container space, a feeding mechanism arranged to receive objects from the inlet mechanism and to feed said objects to the conveyor, in timed relation to the travel of the conveyor, and an outlet mechanism, arranged to receive objects from the conveyor and to transfer said objects from the inside of the container to the outside thereof.

28. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway, an inlet mechanism for transferring objects from the outside to the inside of the container, a feeding mechanism arranged to receive objects from the inlet mechanism and to feed said objects to the conveyor, in timed relation to the travel of the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

29. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway, an inlet mechanism for transferring objects from the outside to the inside of the container, a feeding mechanism arranged to receive objects from the inlet mechanism and to feed said objects to the conveyor, in timed relation to the travel of the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

30. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; an inlet mechanism comprising mutually opposed oscillating gates operable to intermittently confine a space apart from the container space, a magazine for receiving objects in file from the inlet mechanism, means for segregating objects from the file, means for projecting said objects to the conveyor, and an outlet mechanism, arranged to receive objects from the conveyor and to transfer said objects from the inside of the container to the outside thereof.

31. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; an inlet mechanism for transferring objects from the outside to the inside of the container, a magazine for receiving objects in file from the inlet mechanism, means for segregating objects from the file, means for projecting said objects to the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

32. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; an inlet mechanism for transferring objects from the outside to the inside of the container, a magazine for receiving objects in file from the inlet mechanism, means for segregating objects from the file, means for projecting said objects to the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

33. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; an inlet mechanism comprising mutually opposed oscillating gates operable to intermittently confine a space apart from the container space, a rotatable segregating member having rest periods and motion periods, arranged to receive objects in file from the inlet mechanism, said periods being in timed relation to the travel of the conveyor, means for projecting objects from the segregating member to said conveyor, and an outlet mechanism, arranged to receive objects from the conveyor and to transfer said objects from the inside of the container to the outside thereof.

34. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway, an inlet mechanism for transferring objects from the outside to the inside of the container, a rotatable segregating member having rest periods and motion periods, arranged to receive objects in file from the inlet mechanism, said periods being in timed relation to the travel of. the conveyor, means for projecting objects from the segregating member to said conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

35. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; an inlet mechanism for transferring objects from the outside to the inside of the container, a rotatable segregating member having rest periods and motion periods, arranged to receive objects in file from the inlet mechanism, said periods being in timed relation to the travel of the conveyor, means for projecting objects from the segregating member to said conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

36. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating said inlet gates in timed relation to the travel of the conveyor, a feeding mechanism arranged to receive objects from the inlet mechanism and to feed said objects to the conveyor, in timed relation to the travel of the conveyor, and an outlet mechanism, arranged to receive objects from the conveyor and to transfer said objects from the inside of the container to the outside thereof.

37. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating the said inlet gates in timed relation to the travel of the conveyor, a feeding mechanism arranged to receive objects from the inlet mechanism and to feed said objects to the conveyor, in timed relation to the travel of the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

38. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating said inlet gates in timed relation to the travel of the conveyor, a feeding mechanism arranged to receive objects from the inlet mechanism and to feed said objects to the conveyor, in timed relation to the travel of the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

39. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating said inlet gates in timed relation to the travel of the conveyor, a magazine for receiving objects in file from the inlet lock, means for segregating objects from the file, means for projecting said objects to the conveyor, and an outlet mechanism, arranged to receive objects from the conveyor and to transfer said objects from the inside of the container to the outside thereof.

40. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating said inlet gates in timed relation to the travel of the conveyor, a magazine for receiving objects in file from the inlet lock, means for segregating objects from the file, means for projecting said objects to the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

41. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating said inlet gates in timed relation to the travel of the conveyor, a magazine for receiving objects in file from the inlet mechanism, means for segregating objects from the file, means for projecting said objects to the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

42. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, and an outlet mechanism, arranged to receive objects from the conveyor and to transfer said objects from the inside of the container to the outside thereof.

43. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway, a fluid-pressure inlet lock formed of oscillating inlet gates operably disposed in mutually opposed relation, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

44. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; a fluid-pressure inlet lock formed of oscillating inlet gates operably disposed in mutually opposed relation, means for operating said inlet gates in timed relation to the travel of the conveyor; a rotatable segregating member having rest periods and motion periods, arranged to receive objects in file from the inlet lock, said periods being in timed relation to the travel of the conveyor, means for projecting objects from the segregating member to said conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

45. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a feeding mechanism arranged to receive objects from the inlet mechanism and to feed said objects to the conveyor, in timed relation to the travel of the conveyor, and an outlet mechanism, arranged to receive objects from the conveyor and to transfer said objects from the inside of the container to the outside thereof.

46. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a feeding mechanism arranged to receive objects from the inlet mechanism and to feed said objects to the conveyor, in timed relation to the travel of the conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

47. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a feeding mechanism arranged to receive objects from the inlet mechanism and to feed said objects to the conveyor, in timed relation to the travel of the conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

48. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a magazine for receiving objects in file from the inlet lock, means for segregating objects from the file, means for projecting said objects to the conveyor; and an outlet mechanism, arranged to receive objects from the conveyor and to transfer said objects from the inside of the container to the outside thereof.

49. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a magazine for receiving objects in file from the inlet lock, means for segregating objects from the file, means for projecting said objects to the conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

50. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a magazine for receiving objects in file from the inlet lock, means for segregating objects from the file, means for projecting said objects to the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

51. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a rotatable segregating member having rest periods and motion periods, arranged to receive objects in file from the inlet lock, said rest and motion periods being in timed relation to the travel of the conveyor, means for projecting objects from the segregating member to said conveyor, and an outlet mechanism, arranged to receive objects from the conveyor and to transfer said objects from the inside of the container to the outside thereof.

52. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a rotatable segregating member having rest periods and motion periods, arranged to receive objects in file from the inlet lock, said rest and motion periods being in timed relation to the travel of the conveyor, means for projecting objects from the segregating member to said conveyor; a fluid-pressure outlet lock for receiving objects from the conveyor, said outlet gates operably arranged in mutually opposed relation, and means for operating the outlet gates in timed relation to the movements of the inlet gates.

53. A fluid-pressure container, a conveyor disposed internally thereof, said conveyor comprising a continuous runway embracing a plurality of over folds and return folds, superposed, over folds alternating with return folds, the ends of dissimilar folds being joined to each other, means for propelling objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock; means for operating said inlet gates in timed relation to the travel of the conveyor; a rotatable segregating member having rest periods and motion periods, arranged to receive objects in file from the inlet lock, said rest and motion periods being in timed relation to the travel of the conveyor, means for projecting objects from the segregating member to said conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

54. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism comprising mutually opposed oscillating gates operable to intermittently confine a space apart from the container space, a feeding mechanism arranged to receive objects from the inlet mechanism and to feed said objects to the conveyor, in timed relation to the travel of the conveyor; and an outlet mechanism, arranged to receive objects from the conveyor and to transfer said objects from the inside of the container to the outside thereof.

55. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism for transferring objects from the outside to the inside of the container; a feeding mechanism arranged to receive objects from the inlet mechanism and to feed said objects to the conveyor, in timed relation to the travel of the conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

56. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism for transferring objects from the outside to the inside of the container; a feeding mechanism arranged to receive objects from the inlet mechanism and to feed said objects to the conveyor, in timed relation to the travel of the conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

57. A fluid-pressure container, a continuous runway disposed internally thereof, said runway having an entry fold, an exit fold, a plurality of folds interjacent the entry fold and exit folds, arranged in sections lying substantially in planes paralleling each other, also in decks lying substantially in other planes intersecting the first-mentioned planes, transfer limbs joining successive fold sections to each other, means for conveying objects through the said runway; an inlet mechanism comprising mutually opposed oscillating gates operable to intermittently confine a space apart from the container space, a magazine for receiving objects in file from the inlet mechanism, means for segregating objects from the file, means for projecting said objects to the conveyor; and an outlet mechanism, arranged to receive objects from the conveyor and to transfer said objects from the inside of the container to the outside thereof.

58. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism for transferring objects from the outside to the inside of the container; a magazine for receiving objects in file from the inlet mechanism, means for segregating objects from the file, means for projecting said objects to the conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

59. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism for transferring objects from the outside to the inside of the container; a magazine for receiving objects in file from the inlet mechanism, means for segregating objects from the file, means for projecting said objects to the conveyor; oscillating outlet gates operably disposed to mutually form a fluid-pressure lock, said outlet gates arranged to move in cycles, every cycle embracing two locked periods, means for automatically establishing communication between the lock space and the contained space in one period, and between the lock space and the atmosphere in the other period, and means for operating the outlet gates in timed relation to the motions of the inlet gates.

60. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism comprising mutually opposed oscillating gates operable to intermittently confine a space apart from the container space; a rotatable segregating member having rest periods and motion periods, arranged to receive objects in file from the inlet mechanism, said periods being in timed relation to the travel of the conveyor, means for projecting objects from the segregating member to said conveyor; and an outlet mechanism, arranged to receive objects from the conveyor and to transfer said objects from the inside of the container to the outside thereof.

61. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism for transferring objects from the outside to the inside of the container; a rotatable segregating member having rest periods and motion periods, arranged to receive objects in file from the inlet mechanism, said periods being in timed relation to the travel of the conveyor, means for projecting objects from the segregating member to said conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

62. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; an inlet mechanism for transferring objects from the outside to the inside of the container; a rotatable segregating member having rest periods and motion periods, arranged to receive objects in file from the inlet mechanism, said periods being in timed relation to the travel of the conveyor, means for projecting objects from the segregating member to said conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

63. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a feeding mechanism arranged to receive objects from the inlet mechanism and to feed said objects to the conveyor, in timed relation to the travel of the conveyor; and an outlet mechanism, arranged to receive objects from the conveyor and to transfer said objects from the inside of the container to the outside thereof.

64. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a feeding mechanism arranged to receive objects from the inlet mechanism and to feed said objects to the conveyor, in timed relation to the travel of the conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

65. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a feeding mechanism arranged to receive objects from the inlet mechanism and to feed said objects to the conveyor, in timed relation to the travel of the conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

66. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a magazine for receiving objects in file from the inlet mechanism, means for segregating objects from the file, means for projecting said objects to the conveyor; and an outlet mechanism, arranged to receive objects from the conveyor and to transfer said objects from the inside of the container to the outside thereof.

67. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a magazine for receiving objects in file from the inlet lock, means for segregating objects from the file, means for projecting said objects to the conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

68. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a magazine for receiving objects in file from the inlet lock, means for segregating objects from the file, means for projecting said objects to the conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

69. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a rotatable segregating member having rest periods and motion periods, arranged to receive objects in file from the inlet lock, said periods being in timed relation to the travel of the conveyor, means for projecting objects from the segregating member to said conveyor; and an outlet mechanism, arranged to receive objects from the conveyor and to transfer said objects from the inside of the container to the outside thereof.

70. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a rotatable segregating member having rest periods and motion periods, arranged to receive objects in file from the inlet lock, said periods being in timed relation to the travel of the conveyor, means for projecting said objects from the segregating member to said conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

71. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; a fluid-pressure inlet lock formed of oscillating inlet gates operably disposed in mutually opposed relation, means for operating said inlet gates in timed relation to the travel of the conveyor; a rotatable segregating member having rest periods and motion periods, arranged to receive objects in file from the inlet lock, said periods being in timed relation to the travel of the conveyor, means for projecting objects from the segregating member to said conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

72. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a feeding mechanism arranged to receive objects from the inlet mechanism and to feed said objects to the conveyor, in timed relation to the travel of the conveyor; and an outlet mechanism, arranged to receive objects from the conveyor and to transfer said objects from the inside of the container to the outside thereof.

73. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a feeding mechanism arranged to receive objects from the inlet mechanism and to feed said objects to the conveyor, in timed relation to the travel of the conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

74. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a feeding mechanism arranged to receive objects from the inlet mechanism and to feed said objects to the conveyor, in timed relation to the travel of the conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

75. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a magazine for receiving objects in file from the inlet lock, means for segregating objects from the file, means for projecting said objects to the conveyor; and an outlet mechanism, arranged to receive objects from the conveyor and to transfer said objects from the inside of the container to the outside thereof.

76. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a magazine for receiving objects in file from the inlet mechanism, means for segregating objects from the file, means for projecting said objects to the conveyor; a fluid-pressure outlet lock for receiving objects from the conveyor, said outlet lock formed of oscillating outlet gates operably arranged in mutually opposed relation, and means for operating the outlet gates in timed relation to the movements of the inlet gates.

77. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a magazine for receiving objects in file from the inlet lock, means for segregating objects from the file, means for projecting said objects to the conveyor; oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

78. A fluid-pressure container, a continuous runway, disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor; a rotatable segregating member having rest periods and motion periods, arranged to receive objects in file from the inlet lock, said periods being in timed relation to the travel of the conveyor, means for projecting objects from the segregating member to said conveyor; and an outlet mechanism arranged to receive objects from the conveyor and to transfer said objects from the inside of the container to the outside thereof.

79. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, a fluid-pressure outlet lock for receiving objects from the conveyor, said outlet lock formed of oscillating outlet gates operably arranged in mutually opposed relation, and means for operating the outlet gates in timed relation to the movements of the inlet gates.

80. A fluid-pressure container, a continuous runway disposed internally thereof, said runway having an entry fold, an exit fold, a plurality of folds interjacent the entry fold and exit fold, arranged in sections lying substantially in planes paralleling each other, also in decks lying substantially in other planes intersecting the first-mentioned planes, transfer limbs joining successive fold sections to each other, means for conveying objects through the said runway; oscillating inlet gates operably disposed to mutually form a fluid-pressure inlet lock, said inlet gates arranged to move in cycles, every cycle embracing two locked periods, means for automatically establishing communication between the lock space and the atmosphere in one period, and between the lock space and the container space in the other period, means for regulating the admission of objects to the said inlet lock, means for operating said inlet gates in timed relation to the travel of the conveyor, a rotatable segregating member having rest periods and motion periods, arranged to receive objects in file from the inlet lock, said periods being in timed relation to the travel of the conveyor, means for projecting objects from the segregating member to said conveyor, oscillating outlet gates operably disposed to mutually form a fluid-pressure lock, said outlet gates arranged to move in cycles, every cycle embracing two locked periods, means for automatically establishing communication between the lock space and the container space in one period, and between the lock space and the atmosphere in the other period, and means for operating the outlet gates in timed relation to the motions of the inlet gates.

81. A conveyor system comprising a continuous runway, composed, in terms of directional travel through the runway, of a series of over folds and return folds, superposed in alternating order to form sections lying substantially in planes, said folds further, ranked in decks lying substantially in a second plurality of planes intersecting the first planes, thereby constituting a stack substantially rectangular in cross-section; transfer limbs joining dissimilar folds lying in adjacent sections, to constitute a looping structure enclosing the remaining over folds and return folds, an entry fold located at one corner of said rectangular cross-section, an exit fold located at the corner diagonally opposite said entry fold, endless chains following the contour of said runway and means for simultaneously adjusting lengths of said runway and said chains.

82. A conveyor system comprising a continuous runway having an entry fold and an exit fold, with interjacent consecutive sections composed, each, of a plurality of over folds and a plurality of return folds, transfer limbs joining dissimilar folds of successive sections to each other, thereby constituting a looping structure for partially enclosing the remaining folds, endless chains following the contour of said runway and means for simultaneously adjusting lengths of said runway and said chains.

83. A conveyor system comprising a runway in consecutive sections, each section composed, in terms of directional travel through the runway, of a plurality of over folds and return folds, in superposed, alternating relation to each other; transfer limb portions uniting the over fold of one section to the return fold of the next section, or vice versa, thereby constituting a looping structure partially enclosing the remaining over folds and return folds, an entry fold at the beginning of the runway, an exit fold terminating the runway, endless chains following the contour of said runway and means for simultaneously adjusting lengths of said runway and said chains.

84. A continuous conveyor runway having an entry limb and an exit limb, with interjacent consecutive sections, each section composed of a plurality of over folds joined to a plurality of return folds, transfer limbs joining dissimilar folds of successive sections to constitute loops partially enclosing the remaining folds, endless chains with impellers following the contour of said runway, and means for taking up said chains while simultaneously adjusting said runway thereto.

85. A continuous runway in consecutive sections, each section composed, in terms of directional travel through said runway, of over folds and return folds, the said over folds and return folds alternating with each other, and including substantially rectilinear intermediate portions and curved end portions; transfer limbs uniting the over fold of one section to the return fold of the next section or vice versa, together constituting loops partially enclosing the remaining over folds and return folds; an entry fold beginning the said runway, an exit fold terminating the said runway, endless chains with impellers following the contour of said runway, and means for taking up said chains while simultaneously adjusting said runway thereto.

86. A conveyor continuous runway, composed of an entry fold, an exit fold spaced apart therefrom, and a succession of interjacent over folds and return folds alternately with each other, joining the entry fold and the exit fold, the said interjacent folds each having a substantially rectilinear portion with yoke portions curved in directions opposed to each other, at the extremities of the said rectilinear portion, the said yoke portions being joined respectively, to the preceding fold and the succeeding fold, or vice versa, chains substantially coinciding with the contour of said runway, means for rendering certain ones of the said yokes movable for extending the corresponding folds while preserving the continuity thereof, a carriage arranged to support said movable yokes, and wheels mounted on said carriage to engage said chains.

87. A conveyor system comprising flexible endless traveling members located directly opposite each other in two planes substantially parallel to each other, said traveling members each arranged in the general form of a quadrilateral having guide wheels at the vertices thereof for engaging the said traveling members, the traveling members extending around three sides of the quadrilateral, and further, extended re-entrantly of the said quadrilateral from the fourth side thereof, to constitute a plurality of over folds and return folds, a runway whose center line coincides with the center lines of the said traveling members when all the center lines are projected by right lines upon a common projecting plane parallel to the planes of the traveling members, means, carried by the traveling members, for propelling objects through the said runway, and means for tensioning said traveling members, said tensioning means at the same time acting to preserve the coincidence of the runway and traveling member center lines.

88. A conveyor system comprising flexible endless traveling members lying directly opposite to each other in two planes substantially parallel to each other, said traveling members each arranged in the general form of a quadrilateral with guide wheels at the four vertices thereof, the traveling members further, arranged in a plurality of over folds and return folds extending reentrantly of the said quadrilateral from the fourth side thereof, guide wheels for holding the re-entrant portions of said traveling members in place, impellers extending from one traveling member to the other, and a runway whose contour follows the contour of said traveling members, means for yieldably tensioning said traveling members and simultaneously modifying said runway to correspond.

89. A conveyor system comprising a continuous runway arranged in a plurality of over folds and a plurality of return folds, superposed, individual over folds alternating with individual return folds, the ends of dissimilar folds joined to each other, an endless traveling mechanism arranged to follow the course of said folds, including a loop portion to complete the endless feature, a shaft with guide wheels mounted in tensionable relation to said traveling mechanism, a carriage for supporting said shaft, runway yoke portions concentric with said shaft and mounted on said carriage, said yoke portions in telescoping engagement with certain stationary runway portions of said conveyor, and means for adjusting the position of the said carriage.

90. A conveyor system comprising a plurality of stacks adjacent each other, each stack having a continuous runway in consecutive sections similar to one another, each section composed in terms of directional travel through said runway, of over folds and return folds, transfer limbs uniting the return fold of one section to the over fold of the successive section, or vice versa, constituting loops partially enclosing the remaining over folds and return folds, an entry fold beginning the runway, an exit fold terminating the runway, conveyor chains coinciding with the contour of said runway, a shaft with said guide wheels mounted in tensionable relation to said chains, a carriage for supporting said shaft, runway yoke portions concentric with said shaft and mounted on said carriage, said yoke portions in telescoping engagement with certain stationary runway portions of said conveyor, and means for adjusting the position of the said carriage.

91. A conveyor having a continuous runway comprising a succession of over folds and return folds, arranged cross-sectionally considered, in stacked relation to each other, said stacked folds being ranked in alignment with each other defining a plurality of decks, the directional passage of objects through the runway being reversed alternately in successive decks, a plurality of propelling members common to the folds in rank, conveyor chains coinciding with the contour of said runway, a shaft with said guide wheels mounted in tensionable relation to said chains, a carriage for supporting said shaft, runway yoke portions concentric with said shaft and mounted on said carriage, said yoke portions in telescoping engagement with certain stationary runway portions of said conveyor, and means for adjusting the position of the said carriage.

92. A conveyor system comprising a runway having track members and guard members spaced apart from each other and arranged in a succession of over folds and return folds superposed in tiers, and ranked in decks, the tiers and decks, respectively, lying in planes which intersect each other, endless traveling members having impellers extending between the said track members and guard members, substantially in the center planes of the decks, endless traveling members coinciding with the contour of said runway, a shaft with said guide wheels mounted in tensionable relation to said members, a carriage for supporting said shaft, runway yoke portions concentric with said shaft and mounted on said carriage, said yoke portions in telescoping engagement with certain stationary runway portions of said conveyor, and means for adjusting the position of the said carriage.

93. A conveyor having a continuous runway, composed of guide members to prevent displacement in two directions substantially at right angles to each other, of objects conveyed through the runway, said runway extending longitudinally in a succession of over folds and return folds, arranged, cross-sectionally considered, in stacked relation to each other and ranked in decks of over folds alternating with decks of return folds, a plurality of rotatable impellers extending through each deck, track members for supporting the impellers, axles for advancing the impellers, endless flexible traveling members operatively disposed on either side of the said stack and conforming in contour of travel, to the contour of the course defined by the said over folds and return folds, endless traveling members coinciding with the contour of said runway, a shaft with said guide wheels mounted in tensionable relation to said members, a carriage for supporting said shaft, runway yoke portions concentric with said shaft and mounted on said carriage, said yoke portions in telescoping engagement with certain stationary runway portions of said conveyor, and means for adjusting the position of the said carriage.

94. A continuous conveyor runway composed of guide members to prevent displacement in two directions transverse to each other, of objects conveyed through the runway, said runway extending longitudinally in a succession of over folds and return folds, arranged, transversely, in stacked relation to each other, and ranked in decks of over folds alternating with decks of return folds, the decks being spaced apart from each other, stationary beam members located in the spaces between the said decks, means for supporting the said beam members, yokes arranged in extensible relation to over folds and return folds, movable beams supporting said yokes, brackets connecting said movable beams to each other, and guides for mounting said movable beams.

95. A conveyor having a continuous runway defined by guide members, and comprising a succession of over folds and return folds having a longitudinal dimension, endless flexible traveling members operatively disposed alongside the said folds and arranged in contuor of line of travel to follow mainly the center line of the said over folds and return folds, means for tensioning said traveling members, and means, associated with the said tensioning means, for adjusting certain over folds and return folds to conform to the varying lengths of the said traveling members when variously tensioned.

96. A conveyor system comprising a continuous runway having an entry fold, an exit fold spaced apart therefrom, a succession of interjacent folds connecting said entry fold to said exit fold, chains with impellers for propelling objects through the runway, and means for tensioning said chains, simultaneously adjusting the length of the runway thereto.

97. A conveyor having an entry fold and an exit fold, with interjacent consecutive sections composed each of a plurality of folds, transfer limbs joining opposed dissimilar folds of successive sections, thus constituting a continuous runway, means for propelling objects continuously through the runway, means for adjusting said propelling means, and means for simultaneously maintaining the operative relation between the propelling means and the runway.

98. A conveyor system comprising a runway of over folds and return folds, flexible traveling members having impellers following the course of the runway, means for adjustably tensioning the said traveling members and simultaneously adjusting the length of the runway to correspond to the varying lengths of the traveling members.

99. A conveyor with adjusting mechanism, comprising a runway of over fold guides alternating with return fold guides, guide yokes in telescoping engagement with portions of the said fold guides to render said runway extensible, a carriage for said guide yokes, guides for the carriage, endless flexible traveling members arranged to follow the course of the runway, guide wheels engaging the traveling members, means for mounting the guide wheels on said carriage, and means for drawing the carriage in opposition to the pull of said traveling members.

100. A conveyor, with take-up mechanism comprising side brackets spaced apart from each other, means for slidably supporting the side brackets, beam members rigidly connected to each of the side brackets, a shaft mounted in bearings associated with the side brackets, guide wheels mounted on said shaft, and adapted to engage traveling chains constituting parts of the conveyor, runway yoke portions mounted on said beams, concentric with the shaft, said yoke portions placed in telescoping engagement with stationary runway portions of said conveyor, and means for causing the guide wheels to be forcibly drawn in opposition to the pull of the said traveling chains.

101. An extensible runway guide for cans, comprising a member having a stem with a flange extending transversely therefrom, arranged so the cans may roll on said flange and be guided in file by said stem, a bifurcated portion at the end of said stem, and a second member having a tongue slidably fitted into the said bifurcated portion.

102. An extensible runway guide for cans, comprising a member having a stem with a flange extending transversely therefrom, arranged so the cans may roll on said flange and be guided in file by said stem, a bifurcated portion at the end of said stem, a second member having a tongue slidably engaged by said bifurcated portion, and means for mounting said two members so they shall be relatively movable to each other.

103. An extensible runway guide for cans, comprising a member having a stem with a flange extending transversely therefrom, arranged so the cans may roll on said flange and be guided in file by said stem, a bifurcated portion at the end of said stem, a second member having a tongue slidably engaged by said bifurcated portion, means for mounting said two members in adjustable relation to each other, and means for bridging any gap between the two members, to provide the integrity of the support for the rolling cans in all adjusted positions of said two members.

104. An extensible runway guide for cans, comprising a member having a stem with a flange extending transversely therefrom, arranged so the cans may roll on said flange and be guided in file by said stem, a bifurcated portion at the end of said stem, a second member having a tongue slidably engaged by said bifurcated portion, a carriage to support one of the said two members in adjustable relation to the other member, and a plate arranged to bridge any gap between the two members, to provide the integrity of the support for the rolling cans in all adjusted positions of said two members.

105. A container with removable internal conveyor mechanism, said conveyor having extensible runways with adjusting stems, glands arranged in the structure of said container for accommodating said stems, and guiding means for holding said stems in alignment with said glands when the conveyor mechanism is moved.

106. A container with movable internal conveyor system, having a tensioning device with adusting stems extending outwardly therefrom, means in the structure of said container for accommodating said stems, and guiding means arranged to keep said stems in alignment with said accommodating means when the conveyor system is moved.

107. Two gates oscillatingly mounted in mutually opposed and reversed relation, and arranged in conjunction with each other to enclose a space, means for moving one gate to and from its enclosing position to admit objects to the said space, means for moving the other gate to and from its enclosing position to release objects from the said space, means for imparting motion to the two moving means in predetermined relation to each other.

108. Two gates oscillatingly mounted in mutually opposed and reversed relation, and arranged in conjunction with each other to enclose a space, means for moving one gate to and from its enclosing position to admit objects to the said space, means for moving the other gate to and from its enclosing position to release objects from the said space, and means for imparting motion alternately to the two moving means in timed relation to each other.

109. Two gates oscillatingly mounted in mutually opposed and reversed relation, and arranged in conjunction with each other to enclose a space, means for moving one gate to and from its enclosing position to admit objects to the said space, means for moving the other gate to and from its enclosing position to release objects from the said space, a cam arranged to exert motion in cycles, each cycle comprising in order, (1) a pull, (2) a zero effect, (3) a push, (4) another zero effect, and means for transmitting the cyclic motion from the cam to each moving means, with a predetermined interval between the two cyclic motion transmittals.

110. Two gates oscillatingly mounted in mutually opposed and reversed relation, and arranged in conjunction with each other to enclose a space, adjustable means for moving one gate to and from its enclosing position to admit objects to the said space, adjustable means for moving the other gate to and from its enclosing position, to release the objects from said space, and means for imparting motion to the two moving means in predetermined relation to each other.

111. Two gates oscillatingly mounted in mutually opposed and reversed relation, and arranged in conjunction with each other to enclose a space, adjustable means for moving one gate to and from its enclosing position to admit objects to the said space, adjustable means for moving the other gate to and from its enclosing position, to release the objects from said space, and means for imparting motion intermittently to each of the moving means in timed relation to the motion of the other moving means.

112. Two gates oscillatingly mounted in mutually opposed and reversed relation, and arranged in conjunction with each other to enclose a space, adjustable means for moving one gate to and from its enclosing position to admit objects to the said space, adjustable means for moving the other gate to and from its enclosing position, to release the objects from said space, a cam arranged to exert motion in cycles, each cycle comprising in order (1) a pull, (2) a zero effect, (3) a push, (4) another zero effect, and means for transmitting the cyclic motion from the cam to each moving means, with a predetermined interval between the two cyclic motion transmittals.

113. Two gates arranged in conjunction with each other to enclose a space, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, and means for imparting motion to the two moving means in predetermined relation to each other.

114. Two gates arranged in conjunction with each other to enclose a space, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, and means for imparting motion intermittently to each of the moving means in timed relation to the motion of the other moving means.

115. Two gates arranged in conjunction with each other to enclose a space, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, a cam arranged to exert motion in cycles, each cycle comprising in order, (1) a pull, (2) a zero effect, (3) a push, (4) another zero effect, and means for transmitting the cyclic motion from the cam to each rocking means, with a predetermined interval between the two cyclic motion transmittals.

116. Two gates oscillatingly mounted in mutually opposed and reversed relation, and movably mounted, in conjunction with each other to enclose a space, each gate of substantially L shape in the plane of its motion, means for moving one gate to and from its enclosing position to admit objects to the said space, means for moving the other gate to and from its enclosing position to release objects from the said space, and means for imparting motion to the two moving means in predetermined relation to each other.

117. Two gates oscillatingly mounted in mutually opposed and reversed relation, and movably mounted, in conjunction with each other to enclose a space, each gate of substantially L shape in the plane of its motion, means for moving one gate to and from its enclosing position to admit objects to the said space, means for moving the other gate to and from its enclosing position to release objects from the said space, and means for imparting motion intermittently to each of the moving means in timed relation to the motion of the other moving means.

118. Two gates oscillatingly mounted in mutually opposed and reversed relation, and movably mounted, in conjunction with each other to enclose a space, each gate of substantially L shape in the plane of its motion, means for moving one gate to and from its enclosing position to admit objects to the said space, means for moving the other gate to and from its enclosing position to release objects from the said space, a cam arranged to exert motion in cycles, each cycle comprising in order, (1) a pull, (2) a zero effect, (3) a push, (4) another zero effect; and means for transmitting the cyclic motion from the cam to each moving means, with a predetermined interval between the two cyclic motion transmittals.

119. Two gates oscillatingly mounted in mutually opposed and reversed relation, and movably mounted, in conjunction with each other to enclose a space, each gate of substantially L shape in the plane of its motion, adjustable means for moving one gate to and from its enclosing position to admit objects to the said space, adjustable means for moving the other gate to and from its enclosing position to release the objects from said space, and means for imparting motion to the two moving means in predetermined relation to each other.

120. Two gates oscillatingly mounted in mutually opposed and reversed relation, and movably mounted, in conjunction with each other to enclose a space, each gate of substantially L shape in the plane of its motion, adjustable means for moving one gate to and from its enclosing position to admit objects to the said space, adjustable means for moving the other gate to and from its enclosing position to release the objects from said space, and means for imparting motion to the two moving means in predetermined relation to each other, said motion being intermittent.

121. Two gates oscillatingly mounted in mutually opposed and reversed relation, and movably mounted, in conjunction with each other to enclose a space, each gate of substantially L shape in the plane of its motion, adjustable means for moving one gate to and from its enclosing position to admit objects to the said space, adjustable means for moving the other gate to and from its enclosing position, to release the objects from said space, a cam arranged to exert motion in cycles, each cycle comprising in order, (1) a pull, (2) a zero effect, (3) a push, (4) another zero effect; and means for transmitting the cyclic motion from the cam to each moving means, with a predetermined interval between the two cyclic motion transmittals.

122. Two gates movably mounted, in conjunction with each other to enclose a space, each gate of substantially L shape in the plane of its motion, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, and means for imparting motion to the two moving means in predetermined relatio. to each other.

123. Two gates movably mounted, in conjunction with each other to enclose a space, each gate of substantially L shape in the plane of its motion, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, and means for imparting motion intermittently to each of the moving means in timed relation to the motion of the other moving means.

124. Two gates movably mounted, in conjunction with each other to enclose a space, each gate of substantially L shape in the plane of its motion, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, a cam arranged to exert motion in cycles, each cycle comprising in order (1) a pull, (2) a zero effect, (3) a push, (4) another zero effect; and means for transmitting the cyclic motion from the cam to each rocking means, with a predetermined interval between the two cyclic motion transmittals.

125. Two oscillating gates, each of substantially L-shaped section in the plane of its motion, arranged to hold apart two fluids under different pressures, the gates in conjunction with each other in mutually inverted relation at intervals, to enclose a space separate from the two fluids, means for moving one gate to and from its enclosing position to admit objects to the said space, means for moving the other gate to and from its enclosing position to release objects from the said space, and means for imparting motion to the two moving means in predetermined relation to each other.

126. Two oscillating gates, each of substantially L-shaped section in the plane of its motion, arranged to hold apart two fluids under different pressures, the gates in conjunction with each other in mutually inverted relation at intervals, to enclose a space separate from the two fluids, means for moving one gate to and from its enclosing position to admit objects to the said space, means for moving the other gate to and from its enclosing position to release objects from the said space, and means for imparting motion intermittently to each of the moving means in timed relation to the motion of the other moving means.

127. Two oscillating gates, each of substantially L-shaped section in the plane of its motion, arranged to hold apart two fluids under different pressures, the gates in conjunction with each other in mutually inverted relation at intervals, to enclose a space separate from the two fluids, means for moving one gate to and from its enclosing position to admit objects to the said space, means for moving the other gate to and from its enclosing position to release objects from the said space, a cam arranged to exert motion in cycles, each cycle comprising in order, (1) a pull, (2) a zero effect, (3) a push, (4) another zero effect; and means for transmitting the cyclic motion from the cam to each moving means, with a predetermined interval between the two cyclic motion transmittals.

128. Two oscillating gates, each of substantially L-shaped section in the plane of its motion, arranged to hold apart two fluids under different pressures, the gates in conjunction with each other in mutually inverted relation at intervals, to enclose a space separate from the two fluids, adjustable means for moving one gate to and from its enclosing position to admit objects to the said space, adjustable means for moving the other gate to and from its enclosing position, to release the objects from said space, and means for imparting motion to the two moving means in predetermined relation to each other.

129. Two oscillating gates, each of substantially L-shaped section in the plane of its motion, arranged to hold apart two fluids under different pressures, the gates in conjunction with each other in mutually inverted relation at intervals, to enclose a space separate from the two fluids, adjustable means for moving one gate to and from its enclosing position to admit objects to the said space, adjustable means for moving the other gate to and from its enclosing position, to release the objects from said space, and means for imparting motion intermittently to each of the moving means in timed relation to the motion of the other moving means.

130. Two oscillating gates, each of substantially L-shaped section in the plane of its motion, arranged to hold apart two fluids under different pressures, the gates in conjunction with each other in mutually inverted relation at intervals, to enclose a space separate from the two fluids, adjustable means for moving one gate to and from its enclosing position to admit objects to the said space, adjustable means for moving the other gate to and from its enclosing position, to release the objects from said space, a cam arranged to exert motion in cycles, each cycle comprising in order (1) a pull, (2) a zero effect, (3) a push, (4) another zero effect; and means for transmitting the cyclic motion from the cam to each moving means with a predetermined interval between the two cyclic motion transmittals.

131. Two oscillating gates, each of substantially L shaped section in the plane of its motion, arranged to hold apart two fluids under different pressures, the gates in conjunction with each other in mutually inverted relation at intervals, to enclose a space separate from the two fluids, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, and means for imparting motion to the two moving means in predetermined relation to each other.

132. Two oscillating gates, each of substantially L shaped section in the plane of its motion, arranged to hold apart two fluids under different pressures, the gates in conjunction with each other in mutually inverted relation at intervals, to enclose a space separate from the two fluids, a rocker shaft with accessories for moving one gate to and from its enclosing position to admit objects from one fluid to the said space, a second rocker shaft with its accessories for moving the other gate to and from its enclosing position to release the objects from the said space into the other fluid, means for rocking one shaft, means for rocking the other shaft, and means for imparting motion intermittently to each of the rocking means in timed relation to the motion of the other rocking means.

133. Two oscillating gates, each of substantially L shaped section in the plane of its motion, arranged to hold apart two fluids under different pressures, the gates in conjunction with each other in mutually inverted relation at intervals, to enclose a space separate from the two fluids, a rocker shaft with accessories for moving one gate to and from its enclosing position to admit objects from one fluid to the said space, a second rocker shaft with accessories for moving the other gate to and from its enclosing position to release the objects from the said space into the other fluid, means for rocking one shaft, means for rocking the other shaft, a cam arranged to exert motion in cycles, each cycle comprising in order, (1) a pull, (2) a zero effect, (3) a push, (4) another zero effect; and means for transmitting the cyclic motion from the cam to each rocking means, with a predetermined interval between the two cyclic motion transmittals.

134. A fluid-pressure lock comprising two gates having each substantially the shape of the letter L, these gates set together in mutually opposed relation, such, that when the gates are closed, the end of the bar of each gate is adjacent the end of the stem of the other gate thereby constituting a chamber, means for pivotally mounting the gates with the axes thereof perpendicular to a plane cutting out the L shapes, and so that the gates may be opened, away from each other, means for seating the gates with make-and-break contacts, securing said chamber against a fluid under pressure, and means for operating the said gates.

135. A fluid-pressure lock comprising two gates having each, in section, substantially an L shape, the two gates located in conjunction with each other, so as to be in mutually inverted relation when closed, means for oscillatingly mounting said gates in a manner where they shall open in mutually opposed directions, and means for operating the said gates.

136. A fluid-pressure lock comprising two gates having each, in section, substantially an L shape, the two gates located in conjunction with each other, so as to be in mutually inverted relation when closed, means for oscillatingly mounting said gates in a manner where they shall open in mutually opposed directions, a chute structure, arranged to conduct a file of cans, associated with said lock, a portion of the chute structure arranged for confinement within the lock, and means for operating said gates intermittently in mutually overlapping cycles, for the purpose of allowing the cans to pass through said lock in groups.

137. A lock mechanism comprising a chest for confining fluid under pressure, a gate pivoted to operate internally of the chest, a second lock gate pivoted to operate externally thereof, said lock gates together, arranged to form a fluid-pressure lock space apart from the chest space, means for opening and closing said gates, intermittently, in predetermined mutual relation, means for establishing communication between the lock space and the chest space, and between the lock space and the atmosphere, alternately, in harmony with the movement cycles of the said gates.

138. A fluid-pressure lock comprising two gates having each, in section, substantially an L shape, the two gates set in conjunction with each other, in mutually inverted relation when closed, means for oscillatingly mounting the gates so that the centers of oscillation shall lie in a right line which passes through the lock space substantially diagonal therewith, means for seating the gates to form a make-and-break seal, secure against the fluid pressure, and means for automatically opening and closing said gates intermittently, in mutually overlapping cycles.

139. A fluid-pressure lock mechanism, comprising two gates members, means for seating the gate members in mutually opposed relation, arms oscillatingly supported in proximity to the gate members, means for oscillatingly mounting the gate members on the arms at points remote from the centers of oscillation of the arms for the purpose of allowing each gate to accommodate itself to its seat, without restraint.

140. A fluid-pressure lock mechanism, comprising two gate members, means for seating the gate members in mutually opposed relation, arms oscillatingly supported in proximity to the gate members, means for adjustably shifting the center of oscillation of the arms, means for oscillatingly mounting the gate members on the arms at points remote from the centers of oscillation of the arms, for the purpose of allowing each gate to accommodate itself to its seat, without restraint.

141. A fluid-pressure lock mechanism comprising two gate members, means for seating the gate members in mutually opposed relation, arms oscillatingly supported in proximity to the gate members, means for oscillatingly attaching the gate members to the arms at points remote from the centers of oscillation of the arms, for the purpose of allowing each gate to accommodate itself to its seat, without restraint, and means for limiting the oscillation of each gate relatively to the particular arm to which it is attached.

142. A fluid-pressure lock mechanism comprising two gate members, means for seating the gate members in mutually opposed relation, arms oscillatingly supported in proximity to the gate members, means for oscillatingly attaching the gate members to the arms at points remote from the centers of oscillation of the arms, for the purpose of allowing each gate to accommodate itself to its seat, without restraint, and means for adjustably limiting the oscillation of each gate relatively to the particular arm to which it is attached.

143. An inlet lock comprising two mutually opposed oscillating members operable in reversed relation to each other to form a chamber for confining a fluid under pressure, a pressure container auxiliary to the inlet lock, means for automatically equalizing the pressures in the chamber and the container, at one time, and for exhausting the pressure from the chamber at another time, in alternating stages, means for automatically depositing objects in the chamber from the atmosphere, in the exhausted stage, means for automatically discharging the said objects from the chamber into the container, in the equalized pressure stage, and means for automatically operating the said chamber-forming members.

144. An inlet mechanism for automatically transferring cans from the atmosphere into a container confining a fluid under pressure, comprising a chute arranged to guide a file of gravitating cans, regulating members normally obstructing the passage through the chute at a suitable point thereof, a can grouping pocket portion below the regulating members, a fluid-pressure lock consisting of two mutually opposed gates oscillatingly mounted in reversed operable relation to each other, and located below the said pocket portion, means for operating the said lock, and means for clearing the regulating members from the said passage at intervals timed in relation to the operation of the said lock.

145. An inlet mechanism for cans comprising a chute having a reserve portion, a can grouping portion, two mutually opposed oscillating gates arranged to form a lock, regulating members normally extending inwardly of the chute, and located to define the separation between the reserve portion and the can grouping portion, means for operating the gates, and means, actuated by the movement of a gate, for intermittently clearing the regulating members from the chute, 146. An inlet mechanism, comprising a chute member, regulating members normally projecting inwardly thereof, links pivoted to the regulating members, an actuating member operably associated with the links, means for advancing and retracting said actuating member, thereby moving said regulating members outwardly, a fluid-pressure lock having two mutually opposed oscillating gates arranged to intermittently enclose a space, means for imparting motion to the said actuating member in predetermined relation to the operation of the lock, and means for operating said lock.

147. An inlet mechanism, comprising a chute, regulating jaws pivotally mounted and projecting inwardly of the chute, links pivoted to the jaws, a slidable bar pivoted to the links and arranged in advancing to move the jaws outwardly, springs operative to retract the jaws, a fluid-pressure lock having gates operably associated with said chute, and a cam portion carried by one of the said gates for advancing the said bar.

148. A fluid-pressure lock, comprising a seat structure, two oscillating gates mounted on opposite sides of and arranged for operably seating on the seat structure, forming a chamber at timed intervals, an inlet port and an exhaust port in the seat structure, said ports opening into the chamber, valves for controlling the passage of a fluid through said ports, and means for operating the valves in timed relation to the time intervals of the said gates.

149. A fluid-pressure lock, comprising a chest structure having a seat portion, two oscillating gates mounted on opposite sides of, and operably arranged for seating on, the seat portion, forming at timed intervals, a chamber isolated from the chest space, a port leading from the chest space into the chamber space, another port leading from the chamber space into the atmosphere, valves for controlling the passage of fluid through the said ports, and means for actuating said valves in timed relation to the time intervals of the said gates.

150. A fluid-pressure lock, comprising a seat structure, two oscillating gates mounted on opposite sides of, and arranged for operably seating in a make-and-break manner, on, the seat structure, forming a chamber at timed intervals, an inlet port and an exhaust port in the seat structure, said ports leading to and from the chamber, respectively; spring-pressed valves for normally preventing passage of fluid through said ports, means for opening said valves in opposition to the spring pressure, and means for automatically actuating the opening means in timed relation to the time intervals of the said gates.

151. A fluid-pressure lock, comprising a chest structure having a seat portion, two oscillating gates mounted on opposite sides of, and arranged for operably seating in a make-and-break manner, on, the seat portion, forming at timed intervals, a chamber isolated from the chest space, a port leading from the chest space into the chamber space, another port leading from the chamber space into the atmosphere, spring-pressed valves in proximity to each other, for normally preventing passages of fluid through said ports, a rocker having tappets arranged for opening said valves in opposition to the spring pressure, and means for automatically actuating the rocker in timed relation to the time intervals of the said gates.

152. A rotatable element having means for segregating cans from a file, means for exerting a rotative urge on said element, means for moving a file of cans into engagement with said segregating means, means for locking the said rotatable element against the influence of said urging means, a mechanism for receiving cans at predetermined points, and means for periodically disengaging the said locking means in timed relation to the movement of the can receiving mechanism.

153. A rotatable element having means for segregating cans from a file, means for exerting a rotative urge on said element, means for moving a file of cans into engagement with the segregating means, means for locking the said rotatable element against the influence of said urging means, a conveyor arranged to receive cans from the rotatable element, a cam wheel arranged to receive motion in timed relation to the motion of the conveyor, and a latch fixed relatively to the locking means, the said latch arranged for actuation by the cam wheel, whereby said locking means shall be disengaged.

154. A rotatable element having means for segregating cans from a file, means for exerting a rotative urge on said element, means for moving a file of cans into engagement with said segregating means, a ratchet wheel concentric and fixed relatively to the rotatable element, and a latch arranged to arrest the motion of the said ratchet wheel, in opposition to said rotative urge, every time said segregating means comes into registry with a predetermined point, a mechanism for receiving cans at periodic points, and means for disengaging the arresting means in timed relation to the movement of the can receiving mechanism.

155. A rotatable element having means for segregating cans from a file, means for driving the rotatable element, means for moving a file of cans into engagement with the segregating means, a ratchet wheel, concentric and fixed relatively to the rotatable element, a latch arranged to arrest the motion of said ratchet wheel in opposition to said driving means every time said segregating means comes into registry with a predetermined point, a conveyor arranged to receive cans from the rotatable element, a cam wheel arranged to receive motion timed in relation to the motion of the said conveyor, and a second latch fixed relatively to the first latch, the second latch being arranged for actuation by the cam wheel, whereby the first latch shall be disengaged from the ratchet wheel in timed relation to the travel of said conveyor.

156. A rotatable element having means for segregating cans from a file, a belt normally slidable for exerting a rotative urge on said element, a magazine positioned to conduct a file of cans into engagement with the rotatable element in a manner to insinuate said segregating means into spaces between successive cans, means for normally holding the said rotatable element in a locked position contrary to the urge of the said belt, a mechanism for receiving cans at periodic points thereof, from the rotatable element, and means for momentarily disengaging the locking means in timed relation to the movement of the said can receiving mechanism.

157. A rotatable element having means for segregating cans from a file, a belt normally slidable for exerting a rotative urge on said element, a magazine positioned to conduct a file of cans into engagement with the segregating means, means for normally holding the said rotatable element in a locked position contrary to the urge of the said belt, a conveyor arranged to receive cans from the rotatable element, a cam wheel arranged to receive motion in timed relation to the motion of the conveyor, and a latch fixed relatively to the locking means, said latch arranged for actuation by the cam wheel, whereby said locking means shall be momentarily disengaged in timed relation to travel of said conveyor.

158. A rotatable element having means for segregating cans from a file, a belt normally slidable for exerting a rotative urge on said element, a magazine positioned to conduct a file of cans into engagement with the segregating means, a ratchet wheel concentric and fixed relatively to the rotatable element, a latch arranged to engage the ratchet wheel in opposition to the urge of the said belt, a mechanism for receiving the cans at periodic points thereof, from the rotatable element, and means for momentarily releasing the said latch in timed relation to the movement of the can receiving mechanism.

159. A rotatable element having means for segregating cans from a file, means for driving said element, a magazine positioned to conduct a file of cans into engagement with the segregating means, a ratchet wheel concentric and fixed relatively to the rotatable element, a latch arranged to engage the ratchet wheel, in opposition to said driving means, every time said segregating means comes into registry with a predetermined point, a conveyor arranged to receive cans from the rotatable element, a cam wheel arranged to receive motion in timed relation to the movement of the conveyor, and a second latch concentric and fixed relatively to the first latch, the second latch arranged for actuation by the said cam wheel, to release the ratchet wheel in timed relation to travel of said conveyor.

160. A star wheel having vanes and pocket portions arranged to receive cans, a rotatable shaft on which the star wheel is fixed, a belt normally slidable for intermittently imparting motion to the shaft, means for moving a file of cans into engagement with said vanes, means for holding the star wheel normally stationary against the rotative urge of the said belt, a traveling mechanism for receiving cans at periodic points thereof from the star wheel, and means for momentarily disengaging the holding means in timed relation to the movement of the said traveling mechanism.

161. A star wheel having vanes and pocket portions arranged to receive cans, a rotatable shaft on which the star wheel is fixed, driving members for intermittently imparting motion to said shaft, the said driving members consisting of pulleys and a belt, the said belt being normally slidable on one of the said pulleys, means for moving a file of cans into engagement with said vanes, means for normally holding the star wheel stationary, a conveyor arranged to receive cans from the star wheel, a cam wheel arranged to receive motion in timed relation to the travel of the conveyor, and a latch fixed relatively to the holding means, said latch arranged for actuation by the cam wheel for the purpose of momentarily disengaging the holding means in timed relation to the travel of said conveyor.

162. A rotatable shaft, a segregating wheel rigidly mounted thereon, driving members comprising pulleys and a belt normally slidable on one of the pulleys for intermittently imparting motion to the shaft, means for moving a file of cans into engagement with the segregating wheel, a ratchet wheel fixed relatively to the segregating wheel, a latch arranged to engage the ratchet wheel in opposition to the rotative urge of the said driving members, a traveling mechanism having periodic gap portions for receiving cans from the segregating wheel, and means for disengaging the said latch in timed relation to the movement of the said traveling mechanism.

163. A rotatable shaft, a segregating wheel rigidly mounted thereon, driving members for frictionally imparting motion to the shaft, means for moving a file of cans into engagement with the segregating wheel, a ratchet wheel fixed relatively to the segregating wheel, a latch arranged to engage the ratchet wheel in opposition to said frictional driving means every time said segregating wheel comes into registry with a predetermined point, a conveyor arranged to receive cans and located in operating proximity to the segregating wheel, a cam wheel arranged to receive motion in timed relation to travel of the conveyor, a second latch fixed relatively to the first latch, the second latch arranged for actuation by the said cam wheel, whereby the first latch shall be caused to release the ratchet wheel in timed relation to the travel of the said conveyor.

164. A rotatable shaft, a segregating wheel fixed thereon, pulleys and a belt normally slidable on one of the pulleys for imparting motion to said shaft, a magazine positioned to conduct a file of cans into engagement with the segregating wheel in a manner to isolate individual cans from the file, means for locking the said shaft against the rotative urge of said belt, a traveling mechanism arranged for receiving cans at periodic points thereof, and means for disengaging the locking means in timed relation to the movement of the said traveling mechanism.

165. A rotatable segregating wheel, driv ing members comprising pulleys and a belt normally slidable upon one of the pulleys for imparting motion to the said wheel, a magazine positioned to conduct a file of cans into engagement with the segregating wheel in a manner to isolate individual cans from the file, means for normally locking the motion of the segregating wheel, a conveyor arranged for receiving cans from the segregating wheel, a cam wheel arranged to receive motion in timed relation to the travel of the conveyor, a latch fixed relatively to the locking means, said latch arranged for actuation by the cam wheel, whereby said locking means shall be momentarily disengaged in timed relation to travel of the said conveyor.

166. A rotatable star wheel, driving means comprising pulleys and a belt normally slidable upon one of the pulleys, for imparting motion to the said wheels, a magazine positioned to conduct a file of cans into engagement with the star wheel in a manner to isolate individual cans from the file, a ratchet wheel fixed relatively to the star wheel, a latch arranged to engage the ratchet wheel in opposition to the rotative urge of the driving means, a traveling mechanism for periodically receiving cans from the segregating wheel, and means for momentarily releasing the said latch in timed relation to the movement of the traveling mechanism.

167. A star wheel having vanes and pocket portions, means for rotatably mounting the star wheel, means for frictionally causing the star wheel to rotate, a magazine positioned to conduct a file of cans into engagement with the star wheel in a manner to insinuate said vanes into the spaces between successive cans in consecutive order, thereby isolating individual cans and compelling the same to enter the said pocket portions, a ratchet wheel fixed relatively to the star wheel, a latch arranged to engage the ratchet wheel in opposition to the said frictional means every time a said vane comes into registry with a predetermined point, a conveyor arranged to receive cans from the star wheel pocket portions, a cam wheel arranged to receive motion in timed relation to the travel of the conveyor, a second latch fixed relatively to the first latch, said second latch arranged for actuation by the cam wheel, whereby the first latch shall release said ratchet wheel periodically in timed relation to the travel of the said conveyor.

168. A rotatable segregating wheel arranged to separate cans from a file, a traveling conveyor mechanism having impellers spaced apart from each other, defining gaps between successive impellers, said impellers arranged to pass in operative proximity to said segregating wheel, a spring-pressed rotatable friction wheel oscillatingly mounted to contact the segregated cans, thereby urging the cans against passing impellers until said cans are projected into the gaps.

169. A rotatable segregating member having vanes spaced around its axis of rotation, and arranged to receive cans between the vanes, a magazine chute positioned to conduct a file of cans by gravity into engagement with the segregating member, so that the vanes shall isolate individual cans from the file and allow the cans so isolated, to gravitate into the spaces between vanes, means for driving said segregating member, said driving means comprising pulleys and a belt connecting the said pulleys to each other with means for alternately locking and releasing one of the said pulleys relatively to the said belt.

170. A feeding mechanism comprising a rotatable segregating member having pocket portions arranged to receive cans the axes of the cans substantially parallel to the axis of the rotatable segregating member, a rotatable friction wheel spaced radially apart from the segregating member and adapted to contact the cans in said pockets, means for tensioning the friction wheel to yieldably contact the cans, means for intermittently rotating said segregating member, and means for rotating said friction wheel.

171. A feeding device in conjunction with a can-receiving traveling mechanism, comprising a star wheel rotatably mounted, and arranged, to intercept a file of cans, to engage the cans one by one, to separate the one can from its file, and to thrust the one can forward; an oscillating member disposed in proximity to said star wheel, a friction roller rotatably mounted in the swinging end of the oscillating member, the said roller arranged to contact the can as the latter is thrust forward, means for causing the friction roller to exert a yielding pressure on the can, means for imparting motion to the roller, thereby to expel the can from the star wheel and to urge can forward against the traveling mechanism, and finally to roll can into a gap in the said mechanism, when the said gap comes into registry with the can.

172. An inlet mechanism with container, the inlet mechanism comprising, a can guide chute, with an outer gate and an inner gate arranged in mutually opposed relation, to function in an associated motion cycle, specified following, namely: outer gate closed; cans of present cycle approaching through chute, stop at outer gate bar; inner gate opens, releasing cans of the next previous cycle; inner gate closes; outer gate opens, allowing cans of present cycle to move and come to rest against inner gate bar; outer gate closes; inner gate opens, releasing cans; and means for automatically operating said gates to repeat said cycle indefinitely.

173. An inlet mechanism in combination with a container confining a fluid under pressure, the inlet mechanism comprising, a can guide chute, an outer gate and an inner gate operably arranged in mutually opposed relation, to form, in an associated motion cycle, a chamber for confining fluid under said pressure, valves operable to function with said gates, as specified following, namely: outer gate closed, cans of present cycle, approaching through guide chute, stop at outer gate bar; inner gate opens, releasing cans of next previous cycle; inner gate closes, completing chamber and confining fluid under said pressure; fluid exhausts; outer gate opens, allowing cans of present cycle to enter chamber space and to come to rest against inner gate bar; outer gate closes, completing chamber, second instance; said second instance chamber put into communication with fluid-pressure source; inner gate opens, allowing cans to pass into container; means for automatically operating said gates, and means for automatically operating said valves, the gate operating means and valve operating means being co-ordinated in timed relation to each other, to repeat said cycle indefinitely.

174. An outlet mechanism in combination with a container confining a fluid under pressure, the outlet mechanism comprising, a can receiving throat, an inner gate and an outer gate operably arranged in mutually opposed relation, to form at intervals in an associated motion cycle, a chamber for confining fluid under said pressure, valves operable to function with said gates, the said motion cycle embracing stages specified following, namely: inner gate closed, cans of the present cycle, approaching through receiving throat, stop at inner gate bar; outer gate opens, releasing into the atmosphere cans of the next previous motion cycle; outer gate closes completing chamber and confining atmospheric air therein; chamber space put in communication with source of fluid under said pressure; inner gate opens, allowing cans of present motion cycle to enter said chamber and to come to rest against outer gate bar; inner gate closes, completing chamber, second instance, and confining fluid under said pressure; fluid exhausts; outer gate opens, releasing cans of present motion cycle into atmosphere; means for automatically operating said gates, and means for automatically operating said valves, the gate operating means and valve operating means being co-ordinated in timed relation to each other to repeat said motion cycle indefinitely.

175. An outlet mechanism for cans, comprising a receiving throat portion, an inner gate and an outer gate arranged in mutually opposed relation to function in an associated motion cycle in stages specified following, namely: inner gate closed; cans of present cycle approaching through the receiving throat portion, stop at inner gate bar; outer gate opens, releasing cans of next previous cycle; outer gate closes; inner gate opens, allowing cans of present cycle to move and to come to rest against outer gate bar; inner gate closes; outer gate opens, releasing cans of present motion cycle, and means for automatically operating said gates to repeat said cycle indefinitely.

In testimony whereof, we sign our names hereto.

JOHN L. ANDERSON.
JAMES A. ANDERSON.
WILLIAM R. EDDINGTON.